United States Patent
Pasko et al.

(10) Patent No.: US 9,881,021 B2
(45) Date of Patent: Jan. 30, 2018

(54) UTILIZATION OF THIRD PARTY NETWORKS AND THIRD PARTY UNMANNED AERIAL VEHICLE PLATFORMS

(71) Applicant: Verizon Patent and Licensing Inc., Arlington, VA (US)

(72) Inventors: Douglas M. Pasko, Bridgewater, NJ (US); Ashok N. Srivastava, Mountain View, CA (US); Hani Batla, Teaneck, NJ (US); Igor Kantor, Raleigh, NC (US); Gurpreet Ubhi, Nutley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 963 days.

(21) Appl. No.: 14/282,217

(22) Filed: May 20, 2014

(65) Prior Publication Data

US 2016/0300492 A1 Oct. 13, 2016

(51) Int. Cl.
*G06F 17/30* (2006.01)
*H04W 36/30* (2009.01)
(Continued)

(52) U.S. Cl.
CPC ..... *G06F 17/30241* (2013.01); *G06Q 10/083* (2013.01); *G08G 5/006* (2013.01);
(Continued)

(58) Field of Classification Search
CPC ...... G08G 5/003; G08G 5/0013; B60R 25/25; H04B 7/18506; B64F 3/02; G01C 21/3691; H04W 8/22; G07C 9/00571; G01S 19/13
(Continued)

(56) References Cited

U.S. PATENT DOCUMENTS

| | | | |
|---|---|---|---|
| 8,488,556 B2 * | 7/2013 | Muirhead | H04B 7/18506 370/331 |
| 2004/0181327 A1 * | 9/2004 | Tsosie | B60R 25/25 701/36 |

(Continued)

OTHER PUBLICATIONS

Redding et al., "Distributed Multi-Agent Persistent Surveillance and Tracking with Health Management", American Institute Aeronautics and Astronautics, AIAA Guidance, Navigation, and Control Conference, 2011, 18 pages.

(Continued)

*Primary Examiner* — Yuri Kan

(57) ABSTRACT

A device receives a request for a flight path, for a UAV, from a first location to a second location, and calculates the flight path based on the request. The device determines network requirements for the flight path based on the request, and selects a network based on the network requirements. The device generates flight path instructions, and device provides the flight path instructions to the UAV to permit the UAV to travel from the first location to the second location via the flight path. The device receives, at a particular point of the flight path, an indication that the UAV is leaving a coverage area of the network and entering a coverage area of a third party network, and hands off the UAV to a third party device to permit the third party device to monitor traversal of the flight path by the UAV, via the third party network.

20 Claims, 15 Drawing Sheets

(51) Int. Cl.
*G08G 5/00* (2006.01)
*G06Q 10/08* (2012.01)
*H04W 36/14* (2009.01)
*H04W 12/06* (2009.01)

(52) U.S. Cl.
CPC ......... *G08G 5/0013* (2013.01); *G08G 5/0026* (2013.01); *G08G 5/0034* (2013.01); *G08G 5/0039* (2013.01); *G08G 5/0043* (2013.01); *G08G 5/0056* (2013.01); *G08G 5/0069* (2013.01); *G08G 5/0082* (2013.01); *G08G 5/0086* (2013.01); *G08G 5/0091* (2013.01); *H04W 36/30* (2013.01); *H04W 12/06* (2013.01); *H04W 36/14* (2013.01)

(58) Field of Classification Search
USPC ............................ 701/2, 3, 36; 370/328, 331
See application file for complete search history.

(56) References Cited

U.S. PATENT DOCUMENTS

| | | | | |
|---|---|---|---|---|
| 2009/0258643 | A1* | 10/2009 | McGuffin | G08G 5/0013 455/431 |
| 2009/0274097 | A1* | 11/2009 | Budinger | H04B 7/18506 370/328 |
| 2011/0255506 | A1* | 10/2011 | Toth | H04B 7/18506 370/331 |
| 2013/0190964 | A1* | 7/2013 | Uehara | G01C 21/3691 701/25 |
| 2013/0295910 | A1* | 11/2013 | Enty | H04W 8/22 455/419 |
| 2014/0354402 | A1* | 12/2014 | Joao | G07C 9/00571 340/5.52 |
| 2015/0191259 | A1* | 7/2015 | Giovannini | B64F 3/02 701/3 |
| 2015/0298654 | A1* | 10/2015 | Joao | G01S 19/13 701/2 |

OTHER PUBLICATIONS

Richards et al., "Model Predictive Control of Vehicle Maneuvers with Guaranteed Completion Time and Robust Feasibility", American Control Conference, 2003, Proceedings of the 2003, vol. 5, IEEE, 2003, 7 pages.

Park et al., "Agent Technology for Coordinating UAV Target Tracking", Knowledge-Based Intelligent Information and Engineering Systems, Springer Berlin Heidelberg, 2005, 8 pages.

Kuwata et al., "Three Dimensional Receding Horizon Control for UAVs", AIAA Guidance, Navigation, and Control Conference and Exhibit, Aug. 16-19, 2004, 14 pages.

Alighanbari et al., "Filter-Embedded UAV Task Assignment Algorithms for Dynamic Environments", AIAA Guidance, Navigation, and Control Conference and Exhibit, Aug. 16-19, 2004, 15 pages.

Saad et al., "Vehicle Swarm Rapid Prototyping Testbed", American Institute of Aeronautics and Astronautics, Aerospace Conference and AIAA Unmanned . . . Unlimited Conference, 2009, 9 pages.

Richards et al., "Decentralized Model Predictive Control of Cooperating UAVs", $43^{rd}$ IEEE Conference on Decision and Control, vol. 4, IEEE, 2004, 6 pages.

Bertuccelli et al., "Robust Planning for Coupled Cooperative UAV Missions", $43^{rd}$ IEEE Conference on Decision and Control, vol. 3, IEEE, 2004, 8 pages.

Toksoz et al., "Automated Battery Swap and Recharge to Enable Persistent UAV Missions", AIAA Infotech@ Aerospace Conference, 2011, 10 pages.

How et al., "Multi-vehicle Experimental Platform for Distributed Coordination and Control", http://web.mit.edu/people/jhow/durip1.html, Apr. 1, 2004, 4 pages.

Chung Tin, "Robust Multi-UAV Planning in Dynamic and Uncertain Environments", Massachusetts Institute of Technology, 2004, 110 pages.

How et al., "Flight Demonstrations of Cooperative Control for UAV Teams", AIAA $3^{rd}$ "Unmanned Unlimited" Technical Conference, Workshop and Exhibit, Sep. 20-23, 2004, 9 pages.

Wikipedia, "Waze", http://en.wikipedia.org/wiki/Waze, Mar. 30, 2014, 6 pages.

Choi et al., "Information deliver scheme of micro UAVs having limited communication range during tracking the moving target" The Journal of Supercomputing, vol. 66, Issue 2, 2013, pp. 950-972.

Boyd et al., "Convex Optimization", Cambridge University Press, 2004, 730 pages.

\* cited by examiner

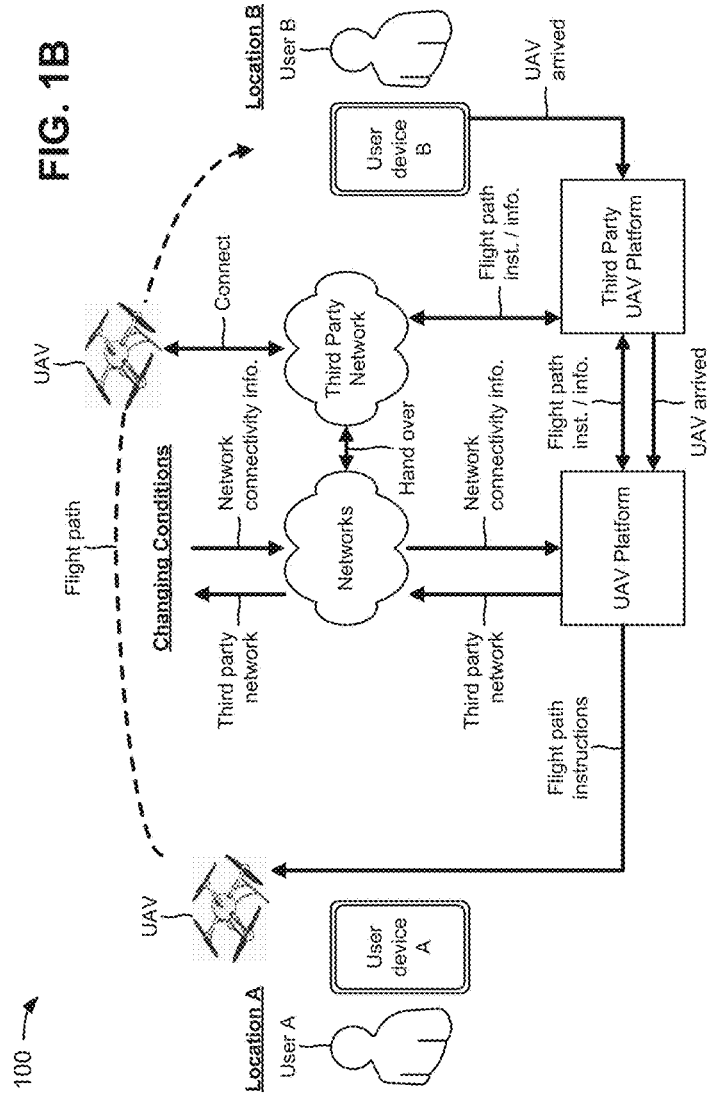

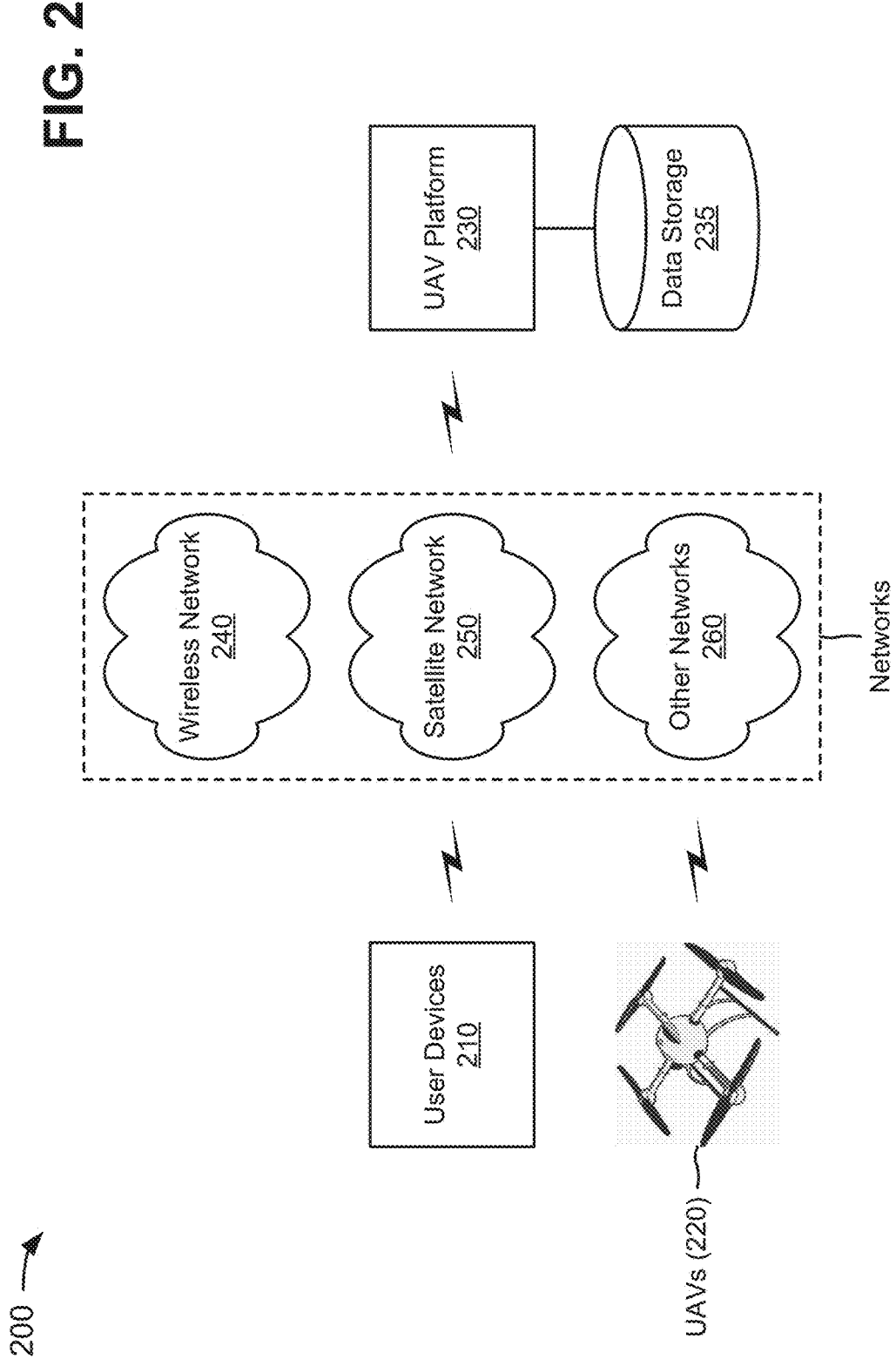

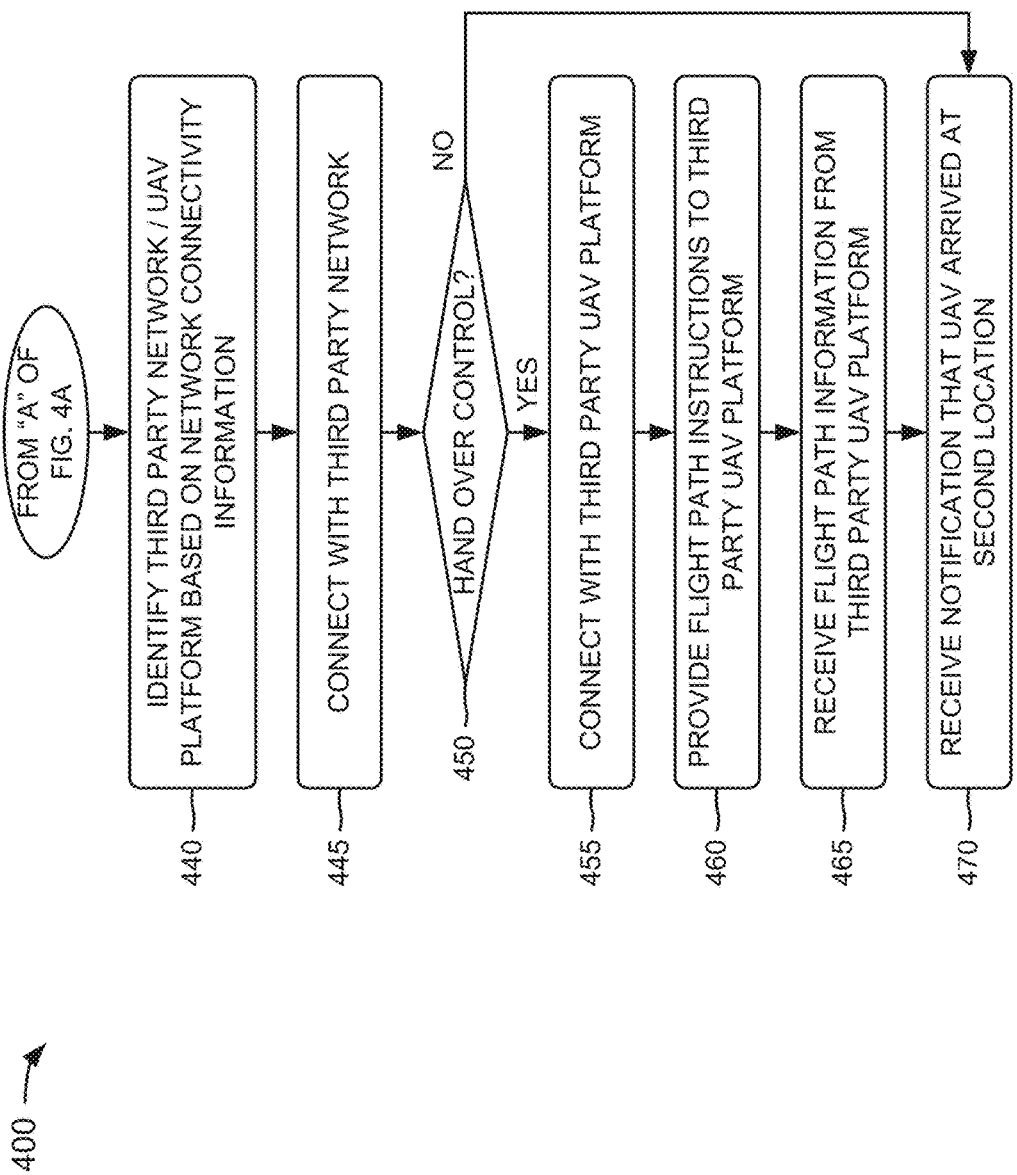

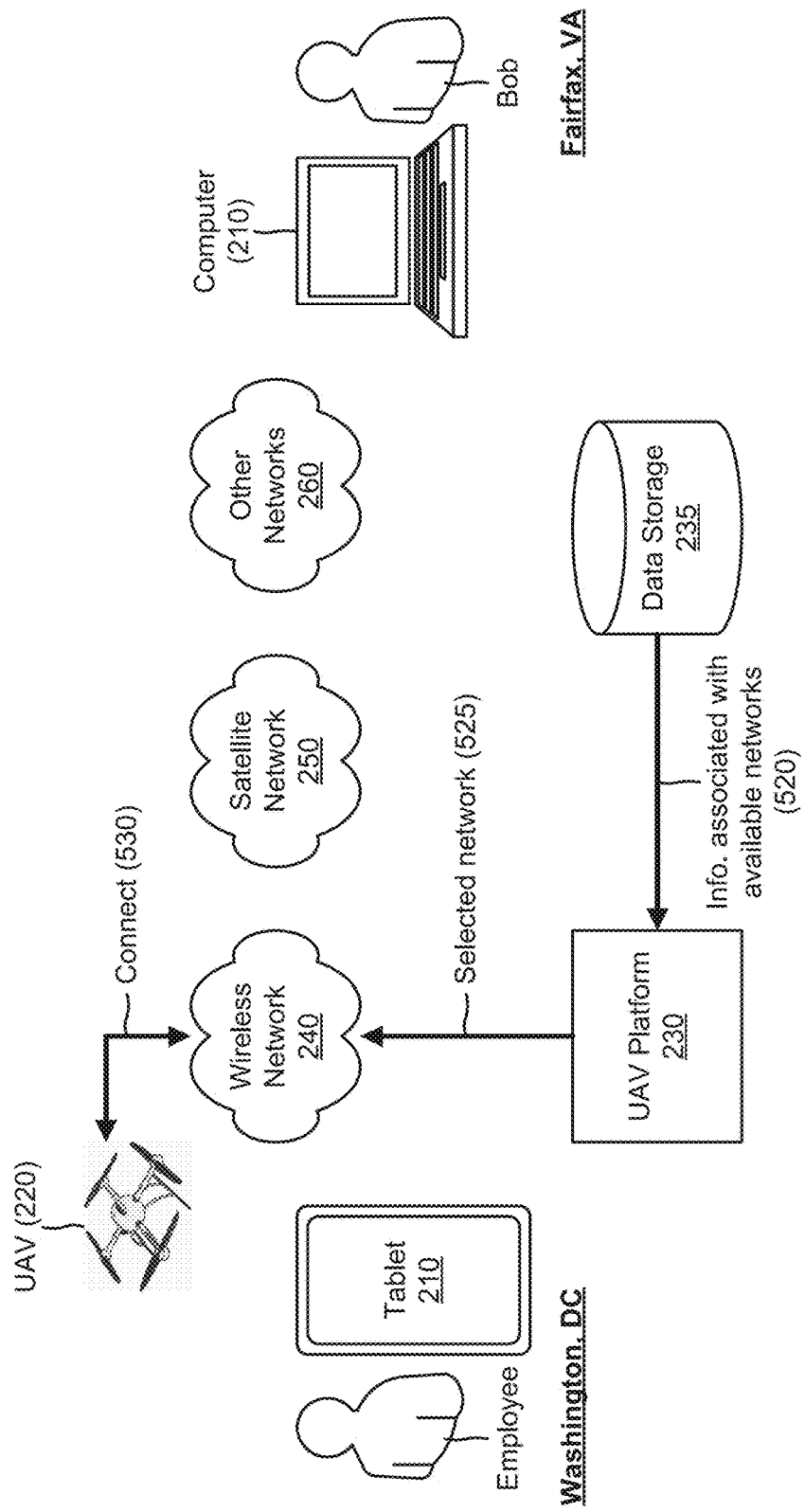

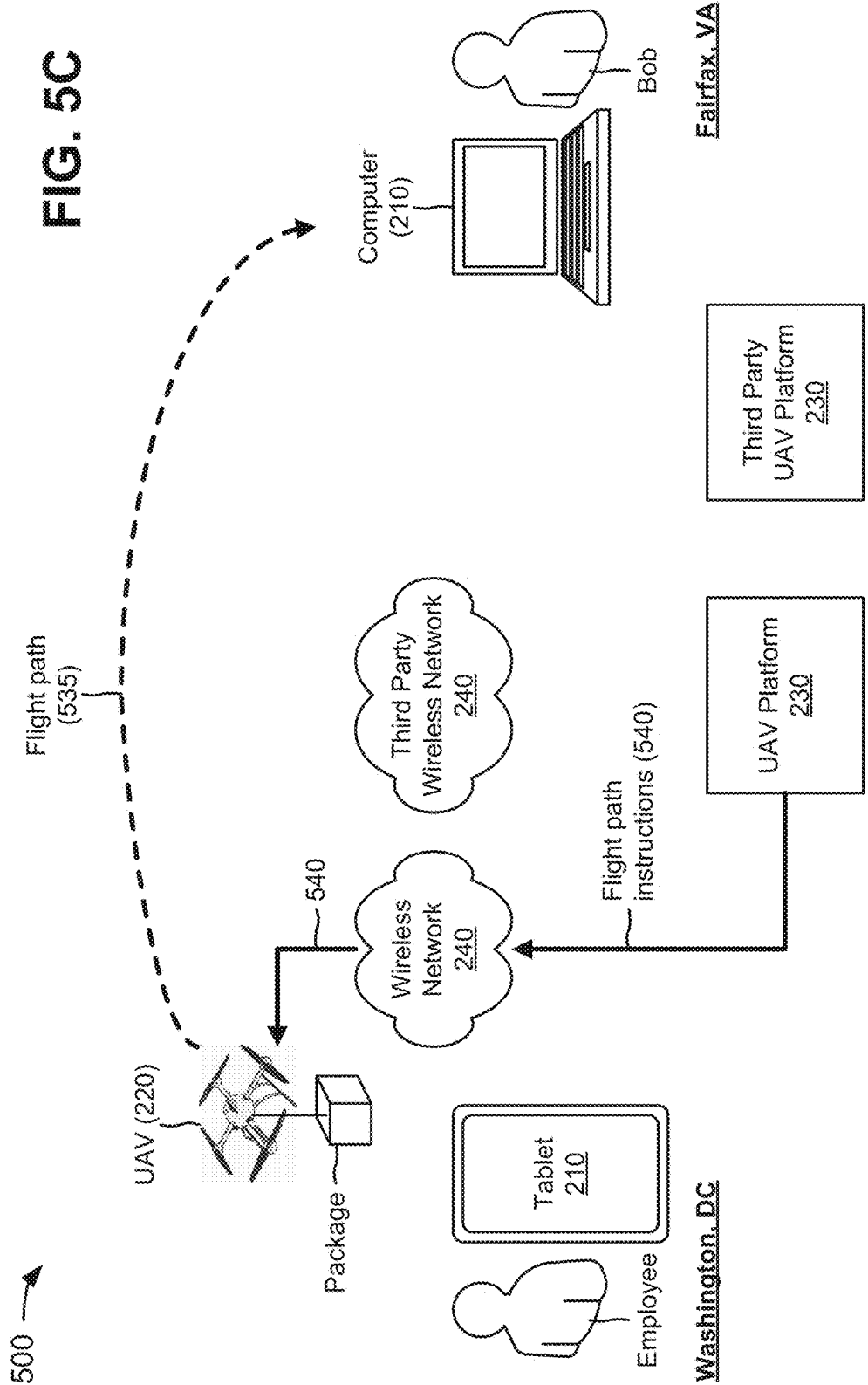

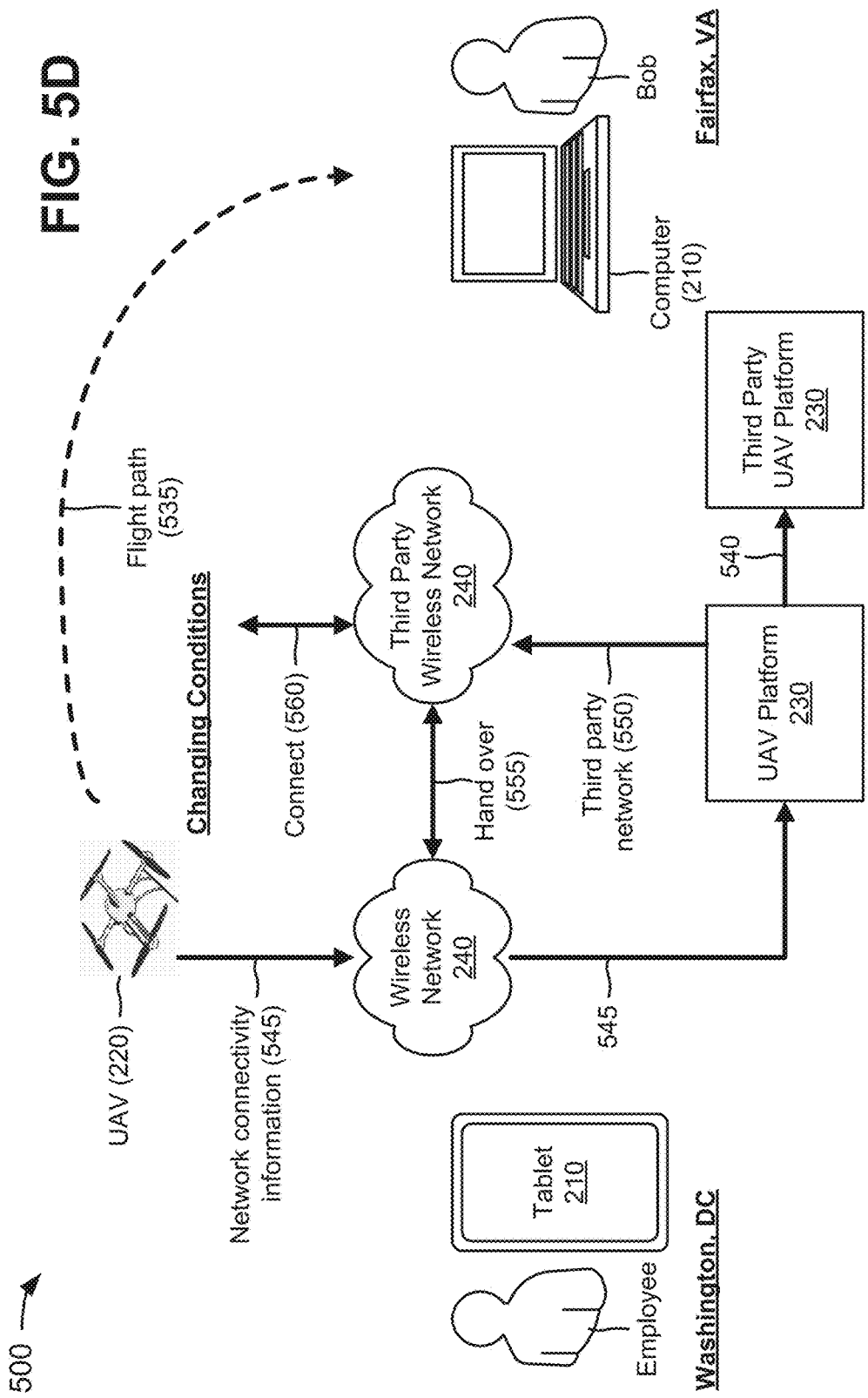

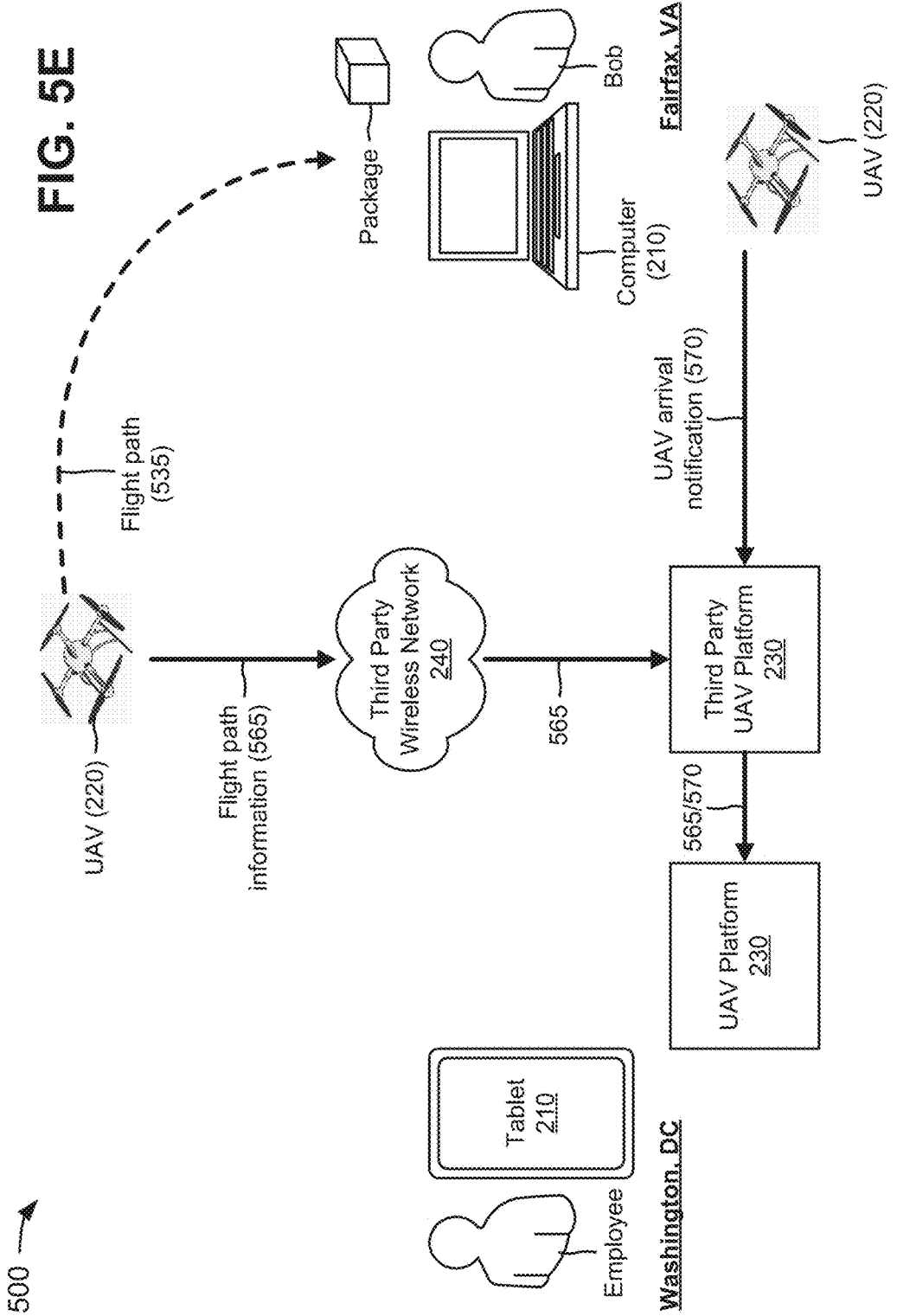

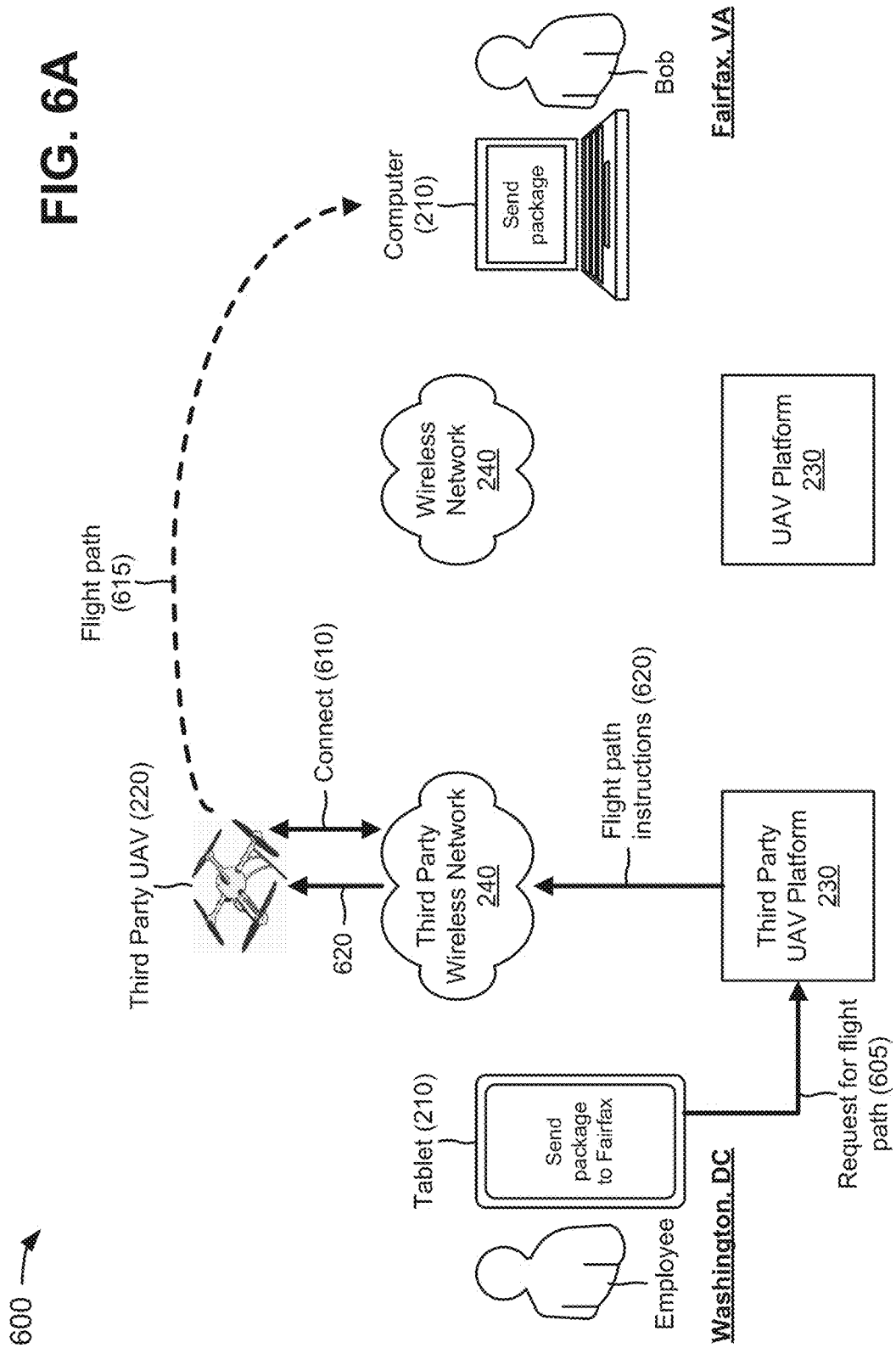

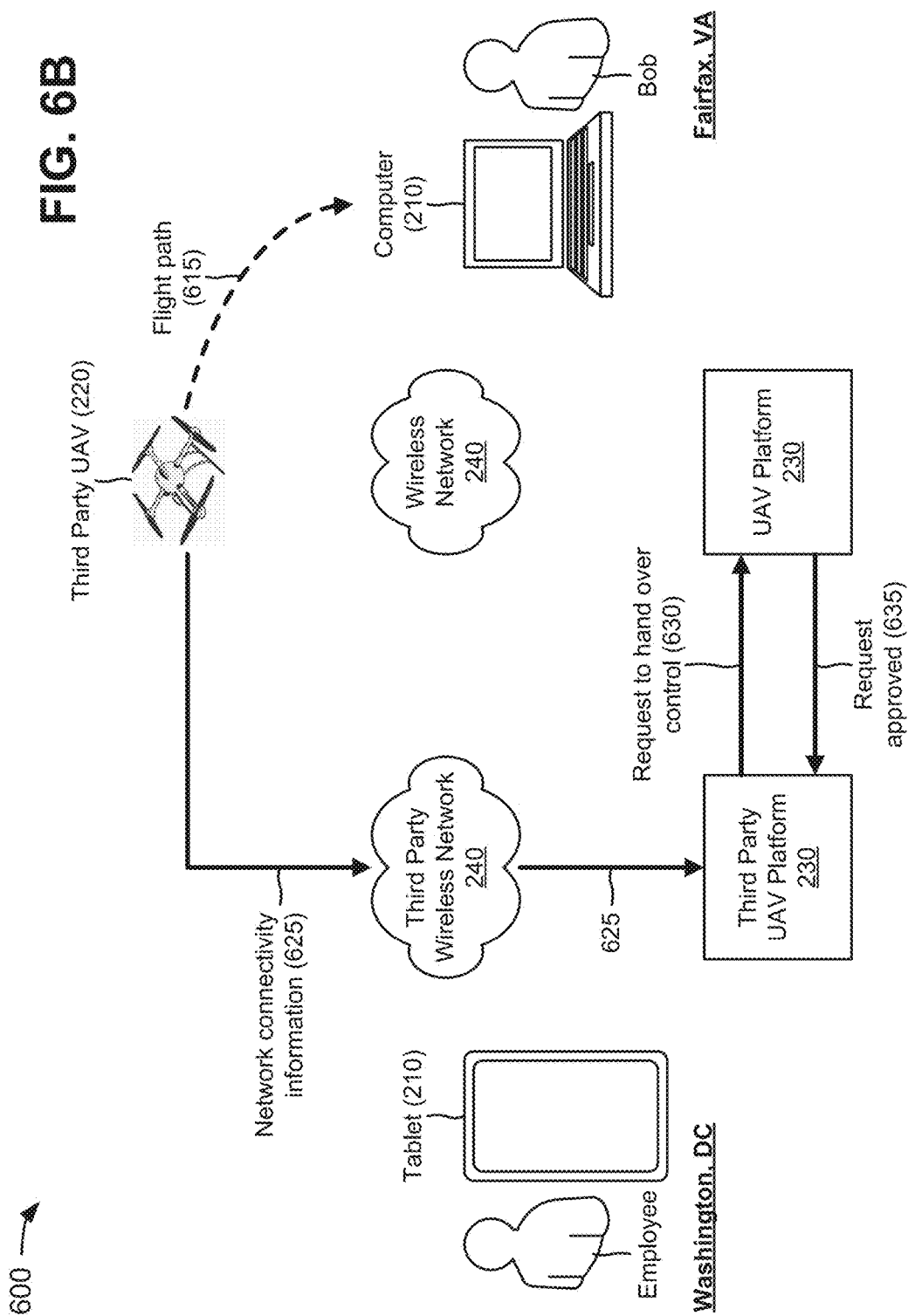

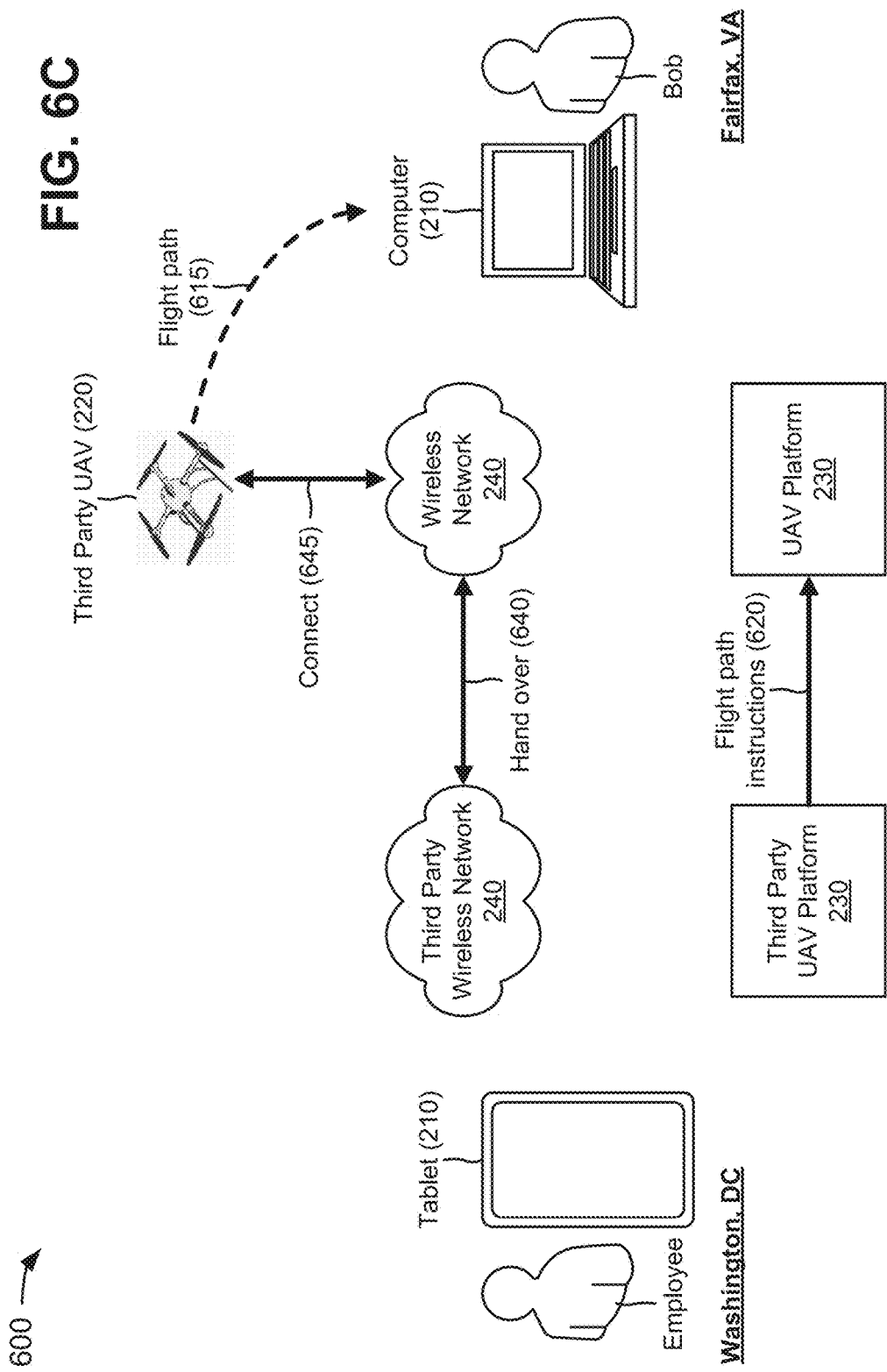

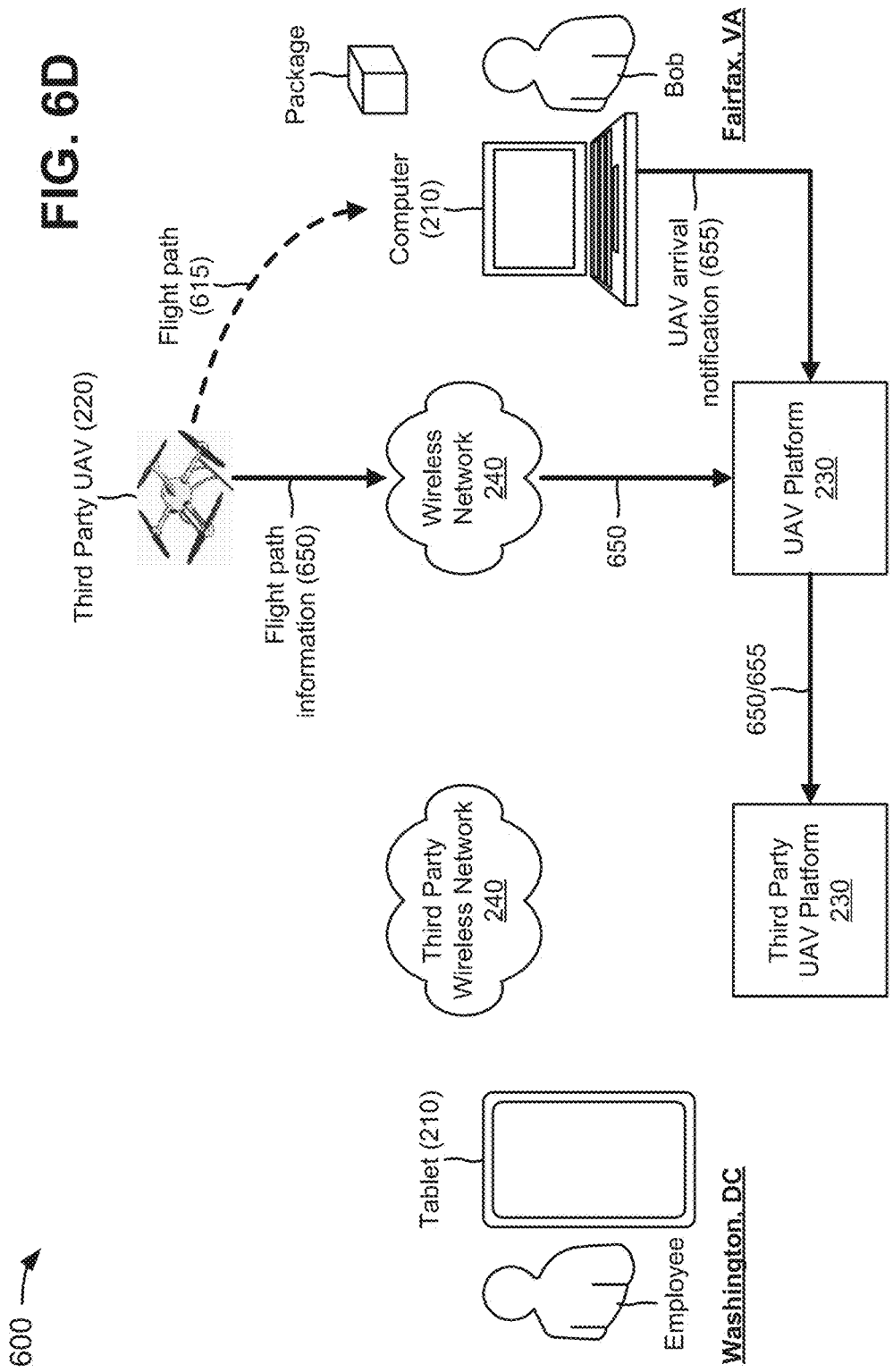

UTILIZATION OF THIRD PARTY NETWORKS AND THIRD PARTY UNMANNED AERIAL VEHICLE PLATFORMS

BACKGROUND

An unmanned aerial vehicle (UAV) is an aircraft without a human pilot aboard. A UAV's flight may be controlled either autonomously by onboard computers or by remote control of a pilot on the ground or in another vehicle. A UAV is typically launched and recovered via an automatic system or an external operator on the ground. There are a wide variety of UAV shapes, sizes, configurations, characteristics, etc. UAVs may be used for a growing number of civilian applications, such as police surveillance, firefighting, security work (e.g., surveillance of pipelines), surveillance of farms, commercial purposes, etc.

BRIEF DESCRIPTION OF THE DRAWINGS

FIGS. 1A and 1B are diagrams of an overview of an example implementation described herein;

FIG. 2 is a diagram of an example environment in which systems and/or methods described herein may be implemented;

FIGS. 4A and 4B depict a flow chart of an example process for utilizing a third party network and/or a third party UAV platform;

FIGS. 5A-5E are diagrams of an example relating to the example process shown in FIGS. 4A and 4B; and FIGS. 6A-6D are diagrams of another example relating to the example process shown in FIGS. 4A and 4B.

DETAILED DESCRIPTION OF PREFERRED EMBODIMENTS

The following detailed description refers to the accompanying drawings. The same reference numbers in different drawings may identify the same or similar elements.

Some private companies propose using UAVs for rapid delivery of lightweight commercial products (e.g., packages), food, medicine, etc. Such proposals for UAVs may need to meet various requirements, such as federal and state regulatory approval, public safety, reliability, individual privacy, operator training and certification, security (e.g., hacking), payload thievery, logistical challenges, etc.

Figure 1A:
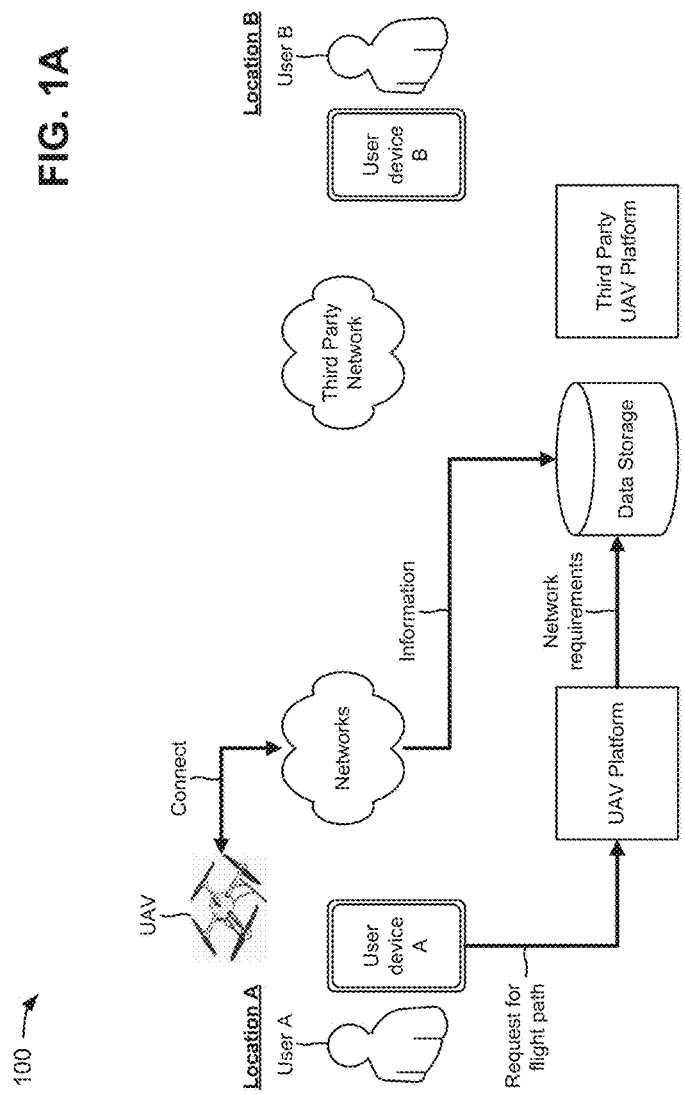

FIGS. 1A and 1B are diagrams of an overview of an example implementation 100 described herein. In example implementation 100, assume that a first user device (e.g., user device A) is associated with a first user (e.g., user A) that is located at an origination location (e.g., location A), as shown in FIG. 1A. Further, assume that user A wants to fly a UAV from location A to a destination location (e.g., location B) in order to deliver a package to a second user (e.g., user B) associated with a second user device (e.g., user device B). As further shown in FIG. 1A, a UAV platform or system may be associated with data storage, and the UAV platform and the data storage may communicate with networks, such as a wireless network, a satellite network, and/or other networks. The networks may provide information to the data storage, such as capability information associated with the UAV (e.g., a thrust, a battery life, etc. associated with the UAV); weather information associated with a geographical region that includes geographical locations of location A, location B, and locations between location A and location B; air traffic information associated with the geographical region; obstacle information (e.g., buildings, mountains, etc.) associated with the geographical region; regulatory information (e.g., no-fly zones, government buildings, etc.) associated with the geographical region; historical information (e.g., former flight paths, former weather, etc.) associated with the geographical region; etc.

As further shown in FIG. 1A, user A may instruct user device A to generate a request for a flight path (e.g., from location A to location B) for the UAV, and to provide the request to the UAV platform. The request may include credentials (e.g., serial numbers, identifiers of universal integrated circuit cards (UICCs), etc.) associated with the UAV. The UAV platform may utilize the UAV credentials to determine whether the UAV is authenticated for utilizing the UAV platform and/or one or more of the networks, and is registered with an appropriate authority (e.g., a government agency) for use. For example, the UAV platform may compare the UAV credentials with UAV account information (e.g., information associated with authenticated and registered UAVs) provided in the data storage to determine whether the UAV is authenticated. In example implementation 100, assume that the UAV is authenticated by the UAV platform.

The UAV platform may calculate a flight path from location A to location B based on aviation information (e.g., the weather information, the air traffic information, etc.) associated with the geographical region. The UAV platform may track the flight path of the UAV based on the UAV's continuous connectivity to a network (e.g., the wireless network, the satellite network, third party networks, etc.), but may lose connectivity with the UAV when the UAV travels outside a range of the network. As further shown in FIG. 1A, the UAV platform may determine network requirements for the flight path based on the request for the flight path. For example, the UAV platform may determine that the UAV is to connect to a cheapest network, a network with the greatest security, a network with the most bandwidth, etc. during traversal of the flight path. The UAV platform may select a particular one of the networks, as the network to which the UAV is to connect and communicate with the UAV platform, based on the network requirements. As further shown in FIG. 1A, the UAV may connect to the particular network based on the selection.

After selecting the particular network, the UAV platform may generate flight path instructions for the flight path, as shown in FIG. 1B. For example, the flight path instructions may indicate that the UAV is to fly at an altitude of two-thousand (2,000) meters, for fifty (50) kilometers and fifty-five (55) minutes, in order to arrive at location B. The UAV platform may provide the flight path instructions to the UAV (e.g., via the particular network), as further shown in FIG. 1B.

The UAV may take off from location A, and may travel the flight path based on the flight path instructions. While the UAV is traversing the flight path, the particular network may receive and/or generate network connectivity information associated with the UAV (e.g., about changing conditions, such as the UAV flying out of range of the particular network, etc.). The particular network may provide the network connectivity information to the UAV platform, and the UAV platform may select a third party network, to which the UAV is to connect, based on the network connectivity information. The third party network may include a network that is managed and/or operated by an entity (e.g., a third party) associated with a third party UAV platform, rather than by an entity associated with the UAV platform (e.g., a service provider that manages and/or operates the wireless network, the satellite network, and/or the other networks, such as, for example, a telecommunication service provider, a television service provider, an Internet service provider, etc.). For example, the UAV platform may select the third party network since the UAV is located in a coverage area provided by the third party network (e.g., but not in coverage areas provided by the wireless network, the satellite network, and/or the other networks).

As further shown in FIG. 1B, the UAV platform may provide the flight path instructions to the third party UAV platform so that the third party UAV platform may monitor and/or control the flight path. The UAV platform may instruct the UAV to connect to the third party network based on the selection, and the particular network may hand over communications to the third party network. As further shown in FIG. 1B, the UAV may connect to the third party network, and may continue to traverse the flight path (e.g., while connected to the third party network) until the UAV arrives at location B. While the UAV continues to traverse the flight path, the third party network may provide flight path information (e.g., a location of the UAV, a speed of the UAV, an altitude of the UAV, etc.) to the third party UAV platform. The UAV platform may provide the flight path information to the UAV platform so that the UAV platform may monitor and/or control the flight path. When the UAV arrives at location B, the UAV and/or user device B may generate a notification indicating that the UAV arrived safely at location B, and may provide the notification to the third party UAV platform. The third party UAV platform may provide the notification to the UAV platform.

Systems and/or methods described herein may provide a platform that enables UAVs to safely traverse flight paths from origination locations to destination locations. The systems and/or methods may enable UAVs to seamlessly connect with various third party networks and/or a third party platform, which may ensure that the platform and/or the third party platform continuously communicate with the UAVs. The systems and/or methods may enable the platform to select a third party network for communicating with the UAV, and the selected third party network may ensure that the UAV traverses a flight path with network connectivity.

FIG. 2 is a diagram of an example environment 200 in which systems and/or methods described herein may be implemented. As illustrated, environment 200 may include user devices 210, UAVs 220, a UAV platform 230, data storage 235, a wireless network 240, a satellite network 250, and other networks 260. Devices/networks of environment 200 may interconnect via wired connections, wireless connections, or a combination of wired and wireless connections.

User device 210 may include a device that is capable of communicating over wireless network 240 with UAV 220, UAV platform 230, and/or data storage 235. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a global positioning system (GPS) device; a gaming device; or another type of computation and communication device.

UAV 220 may include an aircraft without a human pilot aboard, and may also be referred to as an unmanned aircraft (UA), a drone, a remotely piloted vehicle (RPV), a remotely piloted aircraft (RPA), or a remotely operated aircraft (ROA). In some implementations, UAV 220 may include a variety of shapes, sizes, configurations, characteristics, etc. for a variety of purposes and applications. In some implementations, UAV 220 may include one or more sensors, such as electromagnetic spectrum sensors (e.g., visual spectrum, infrared, or near infrared cameras, radar systems, etc.); biological sensors; chemical sensors; etc. In some implementations, UAV 220 may utilize one or more of the aforementioned sensors to sense (or detect) and avoid an obstacle in or near a flight path of UAV 220.

In some implementations, UAV 220 may include a particular degree of autonomy based on computational resources provided in UAV 220. For example, UAV 220 may include a low degree of autonomy when UAV 220 has few computational resources. In another example, UAV 220 may include a high degree of autonomy when UAV 220 has more computational resources (e.g., built-in control and/or guidance systems to perform low-level human pilot duties, such as speed and flight-path stabilization, scripted navigation functions, waypoint following, etc.). The computational resources of UAV 220 may combine information from different sensors to detect obstacles on the ground or in the air; communicate with one or more of networks 240-260 and/or other UAVs 220; determine an optimal flight path for UAV 220 based on constraints, such as obstacles or fuel requirements; determine an optimal control maneuver in order to follow a given path or go from one location to another location; regulate a trajectory of UAV 220; etc. In some implementations, UAV 220 may include a variety of components, such as a power source (e.g., an internal combustion engine, an electric battery, a solar-powered battery, etc.); a component that generates aerodynamic lift force (e.g., a rotor, a propeller, a rocket engine, a jet engine, etc.); computational resources; sensors; etc.

UAV platform 230 may include one or more personal computers, one or more workstation computers, one or more server devices, one or more virtual machines (VMs) provided in a cloud computing network, or one or more other types of computation and communication devices. In some implementations, UAV platform 230 may be associated with a service provider that manages and/or operates wireless network 240, satellite network 250, and/or other networks 260, such as, for example, a telecommunication service provider, a television service provider, an Internet service provider, etc. In some implementations, UAV platform 230 may be a third party UAV platform 230 that is associated with a service provider that manages and/or operates third party networks (e.g., a third party wireless network 240, a third party satellite network 250, and/or third party other networks 260), such as, for example, a telecommunication service provider, a television service provider, an Internet service provider, etc.

In some implementations, UAV platform 230 may receive, from user device 210, a request for a flight path from an origination location to a destination location. UAV platform 230 may calculate the flight path from the origination location to the destination location based on aviation information (e.g., weather information, air traffic information, etc.), and may determine network requirements for the flight path based on the request for the flight path. UAV platform 230 may select a particular network, from available networks, based on the network requirements for the flight path. After selecting the network, UAV platform 230 may generate flight path instructions that identify the selected network, and may provide the flight path instructions to UAV 220. UAV 220 may connect to the selected network, based on the flight path instructions, so that UAV 220 may communicate with UAV platform 230. UAV platform 230 may receive network connectivity information from UAV 220 during traversal of the flight path by UAV 220. UAV platform 230 may identify a third party network and a third party UAV platform 230 based on the network connectivity information, and may connect with the third party network and the third party UAV platform 230. UAV platform 230 may provide the flight path instructions to the third party UAV platform 230, and may receive flight path information (e.g., received from the third party network and/or UAV 220) from the third party UAV platform 230. UAV platform 230 may receive a notification that UAV 220 arrived at the destination location when UAV 220 lands at the destination location.

In some implementations, UAV platform 230 may authenticate one or more users, associated with user device 210 and/or UAV 220, for utilizing UAV platform 230, and may securely store authentication information associated with the one or more users. In some implementations, UAV platform 230 may adhere to requirements to ensure that UAVs 220 safely traverse flight paths, and may limit the flight paths of UAVs 220 to particular safe zones (e.g., particular altitudes, particular geographical locations, particular geo-fencing, etc.) to further ensure safety.

Data storage 235 may include one or more storage devices that store information in one or more data structures, such as databases, tables, lists, trees, etc. In some implementations, data storage 235 may store information, such as UAV account information (e.g., serial numbers, model numbers, user names, etc. associated with UAVs 220); capability information associated with UAVs 220 (e.g., thrust, battery life, etc. associated with UAVs 220); weather information associated with a geographical region (e.g., precipitation amounts, wind conditions, etc.); air traffic information associated with the geographical region (e.g., commercial air traffic, other UAVs 220, etc.); obstacle information (e.g., buildings, mountains, towers etc.) associated with the geographical region; regulatory information (e.g., no-fly zones, government buildings, etc.) associated with the geographical region; historical information (e.g., former flight paths, former weather conditions, etc.) associated with the geographical region; etc. In some implementations, data storage 235 may be included within UAV platform 230.

Wireless network 240 may include a fourth generation (4G) cellular network that includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may be referred to as an evolved universal terrestrial radio access network (E-UTRAN), and may include one or more base stations (e.g., cell towers). The EPC network may include an all-Internet protocol (IP) packet-switched core network that supports high-speed wireless and wireline broadband access technologies. The EPC network may allow user devices 210 and/or UAVs 220 to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching. In some implementations, wireless network 240 may provide location information (e.g., latitude and longitude coordinates) associated with user devices 210 and/or UAVs 220. For example, wireless network 240 may determine a location of user device 210 and/or UAV 220 based on triangulation of signals, generated by user device 210 and/or UAV 220 and received by multiple cell towers, with prior knowledge of the cell tower locations.

Satellite network 250 may include a space-based satellite navigation system (e.g., a global positioning system (GPS)) that provides location and/or time information in all weather conditions, anywhere on or near the Earth where there is an unobstructed line of sight to four or more satellites (e.g., GPS satellites). In some implementations, satellite network 250 may provide location information (e.g., GPS coordinates) associated with user devices 210 and/or UAVs 220, enable communication with user devices 210 and/or UAVs 220, etc.

Each of other networks 260 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a cloud computing network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
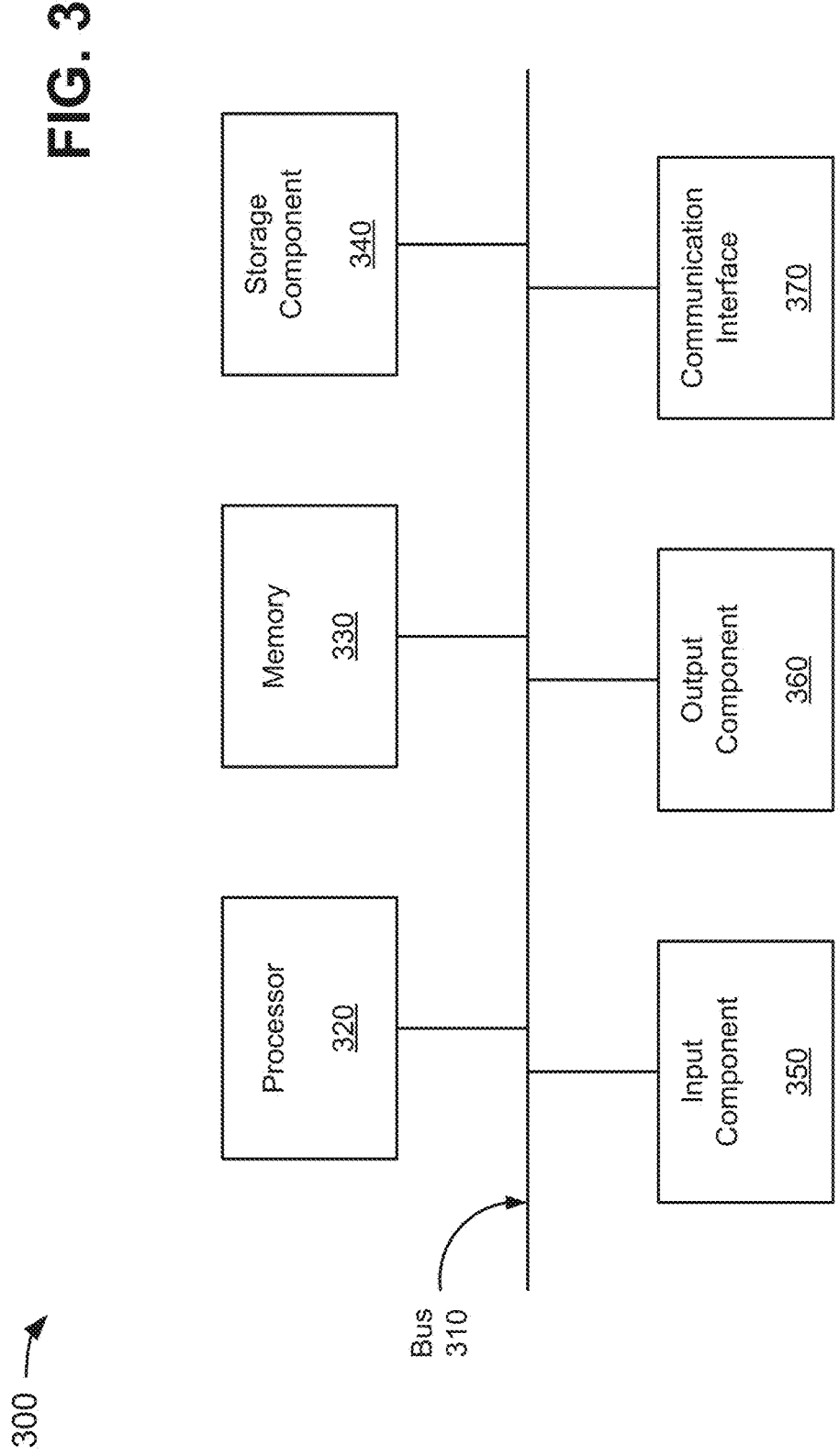
FIG. 3 is a diagram of example components of one or more devices of FIG. 2.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:

FIGS. 4A and 4B depict a flow chart of an example process 400 for utilizing a third party network and/or a third party UAV platform. In some implementations, one or more process blocks of FIGS. 4A and 4B may be performed by UAV platform 230. In some implementations, one or more process blocks of FIGS. 4A and 4B may be performed by another device or a group of devices separate from or including UAV platform 230, such as user device 210 and/or UAV 220.

As shown in FIG. 4A, process 400 may include receiving a request for a flight path from a first location to a second location in a region (block 405). For example, UAV platform 230 may receive, from user device 210, a request for a flight path from a first location to a second location in a particular region. In some implementations, the request for the flight path may include a request for flight path instructions from an origination location (e.g., a current location of UAV 220) to a destination location (e.g., a location in the particular region). The origination location and the destination location may be provided in the particular region. In some implementations, UAV 220 may be associated with UAV platform 230 and/or user(s) associated with user device 210. For example, user device 210 and UAV 220 may be owned and/or operated by a delivery company, a telecommunication service provider, a television service provider, an Internet service provider, etc. In some implementations, UAV 220 may be associated with a third party UAV platform 230 (e.g., separate from UAV platform 230) that is managed and/or operated by a service provider, such as, for example, a telecommunication service provider, a television service provider, an Internet service provider, etc.

As further shown in FIG. 4A, process 400 may include calculating the flight path from the first location to the second location based on aviation information (block 410). For example, UAV platform 230 may calculate the flight path from the origination location to the destination location based on aviation information. In some implementations, UAV platform 230 may calculate the flight path from the origination location to the destination location based on aviation information associated with the particular region, such as the weather information, the air traffic information, the obstacle information, the regulatory information, the historical information, etc. stored in UAV platform 230 and/or data storage 235. In some implementations, UAV platform 230 may determine whether the aviation information indicates that UAV 220 may safely complete the flight path from the origination location to the destination location without stopping. If UAV platform 230 determines that UAV 220 cannot safely complete the flight path from the origination location to the destination location without stopping (e.g., to recharge or refuel), UAV platform 230 may determine one or more waypoints along the flight path for stopping and recharging or refueling.

In some implementations, UAV platform 230 may calculate the flight path based on the weather information. For example, UAV platform 230 may determine that, without weather issues, the flight path may take UAV 220 two hours to complete at an altitude of five-hundred meters. UAV platform 230 may further determine that wind conditions at five-hundred meters may create a headwind of fifty kilometers per hour on UAV 220, but that wind conditions at one-thousand meters may create a tailwind of fifty kilometers per hour on UAV 220. In such an example, UAV platform 230 may alter the flight path from an altitude of five-hundred meters to an altitude of one-thousand meters (e.g., if UAV 220 is capable of reaching the altitude of one-thousand meters). Assume that the tailwind at the altitude of one-thousand meters decreases the flight time from two hours to one hour and thirty minutes. Alternatively, UAV platform 230 may not alter the flight path, but the headwind at the altitude of five-hundred meters may increase the flight time from two hours to two hours and thirty minutes.

Additionally, or alternatively, UAV platform 230 may calculate the flight path based on the air traffic information. For example, UAV platform 230 may determine that, without air traffic issues, the flight path may take UAV 220 two hours to complete at an altitude of five-hundred meters. UAV platform 230 may further determine that other UAVs 220 are flying at the altitude of five-hundred meters based on the air traffic information, but that no other UAVs 220 are flying at an altitude of one-thousand meters. In such an example, UAV platform 230 may alter the flight path from an altitude of five-hundred meters to an altitude of one-thousand meters. The altitude of one-thousand meters may enable UAV 220 to safely arrive at the location without the possibility of colliding with the other UAVs 220. Alternatively, UAV platform 230 may not alter the flight path, but the other UAVs 220 flying at the altitude of five-hundred meters may increase the possibility that UAV 220 may collide with another UAV 220. UAV platform 230 may then determine whether UAV 220 is capable of safely flying at the altitude of five-hundred meters without colliding with another UAV 220.

Additionally, or alternatively, UAV platform 230 may calculate the flight path based on the obstacle information. For example, UAV platform 230 may determine that, without obstacle issues, the flight path may take UAV 220 one hour to complete at an altitude of two-hundred meters. UAV platform 230 may further determine that one or more buildings are two-hundred meters in height based on the obstacle information, but that no other obstacles are greater than two-hundred meters in height. In such an example, UAV platform 230 may alter the flight path from an altitude of two-hundred meters to an altitude of three-hundred meters. The altitude of three-hundred meters may enable UAV 220 to safely arrive at the location without the possibility of colliding with the one or more buildings. Alternatively, UAV platform 230 may not alter the altitude of the flight path, but may change the flight path to avoid the one or more buildings, which may increase the flight time from one hour to one hour and thirty minutes.

Additionally, or alternatively, UAV platform 230 may calculate the flight path based on the regulatory information. For example, UAV platform 230 may determine that, without regulatory issues, the flight path may take UAV 220 one hour to complete at an altitude of five-hundred meters. UAV platform 230 may further determine that the flight path travels over a restricted facility based on the regulatory information. In such an example, UAV platform 230 may change the flight path to avoid flying over the restricted facility, which may increase the flight time from one hour to one hour and thirty minutes.

Additionally, or alternatively, UAV platform 230 may calculate the flight path based on the historical information. For example, UAV platform 230 may identify prior flight paths from the origination location to the destination location from the historical information, and may select one of the prior flight paths, as the flight path. For example, assume that UAV platform 230 identifies three prior flight paths that include flight times of two hours, three hours, and four hours, respectively. In such an example, UAV platform 230 may select, as the flight path, the prior flight path with the flight time of two hours.

As further shown in FIG. 4A, process 400 may include determining network requirements for the flight path based on the request for the flight path (block 415). For example, UAV platform 230 may determine network requirements for the flight path based on the request for the flight path. In some implementations, UAV platform 230 may determine the network requirements based on the origination location, the destination location, and/or the particular region associated with the flight path. For example, UAV platform 230 may determine that the flight path requires one or more of networks 240-260 or third party networks at or near the origination location, the destination location, the particular region, etc. so that UAV 220 may communicate with UAV platform 230. In such an example, UAV platform 230 may determine that UAV 220 may communicate with UAV platform 230, via wireless network 240, during traversal of the flight path by UAV 220. In another example, UAV platform 230 may determine that UAV 220 may communicate with UAV platform 230 via wireless network 240 during a portion of the flight path, may communicate with UAV platform 230 via satellite network 250 during another portion of the flight path, may communicate with UAV platform 230 via a third party network during still another portion of the flight path, etc.

In some implementations, UAV platform 230 may determine that the flight path requires utilization of a most reliable network or networks for communication with UAV 220. For example, UAV platform 230 may determine that the flight path requires wireless network 240 (e.g., a cellular network), if wireless network 240 is available, since wireless network 240 may be more reliable than satellite network 250 and/or other networks 260. If wireless network 240 is not available, UAV platform 230 may determine that the flight path requires satellite network 250 (e.g., a GPS network), if satellite network 250 is available, since satellite network 250 may be more reliable than other networks 260. If wireless network 240 and satellite network 250 are not available, UAV platform 230 may determine that the flight path requires other networks 260, such as a Wi-Fi network, a cellular network generated by a dedicated UAV 220 (e.g., a stationary UAV 220, with a constant power source, that provides cellular coverage), a wireless network hotspot (e.g., a mobile hotspot), etc.

In some implementations, if none of networks 240-260 are available but a third party network is available, UAV platform 230 may determine that UAV 220 is to traverse flight path (e.g., and communicate with UAV platform 230 via the third party network) until UAV 220 enters an area covered by one of networks 240-260. In some implementations, if multiple wireless networks 240, satellite networks 250, and/or other networks 260 are available, UAV platform 230 may determine that the flight path requires a most reliable network of wireless networks 240, satellite networks 250, and/or other networks 260.

In some implementations, UAV platform 230 may determine that the flight path requires utilization of a least expensive network or networks for communication with UAV 220. For example, UAV platform 230 may determine that the flight path requires other networks 260 (e.g., a Wi-Fi network), if other networks 260 are available, since other networks 260 may be less expensive to utilize than wireless network 240 and/or satellite network 250. If other networks 260 are not available, UAV platform 230 may determine that the flight path requires satellite network 250 (e.g., a GPS network), if satellite network 250 is available, since satellite network 250 may be less expensive to utilize than wireless network 240. If satellite network 250 and other networks 260 are not available, UAV platform 230 may determine that the flight path requires wireless network 240, such as a cellular network. If none of networks 240-260 are available, UAV platform 230 may determine that the flight path requires a least expensive third party network (e.g., a third party wireless network, satellite network, etc.). In some implementations, if multiple wireless networks 240, satellite networks 250, and/or other networks 260 are available, UAV platform 230 may determine that the flight path requires a least expensive of wireless networks 240, satellite networks 250, and/or other networks 260.

In some implementations, UAV platform 230 may determine that the flight path requires utilization of a most secure network or networks for communication with UAV 220. For example, UAV platform 230 may determine that the flight path requires wireless network 240 (e.g., a cellular network), if wireless network 240 is available, since wireless network 240 may be more secure than satellite network 250 and/or other networks 260. If wireless network 240 is not available, UAV platform 230 may determine that the flight path requires satellite network 250 (e.g., a GPS network), if satellite network 250 is available, since satellite network 250 may be more secure than other networks 260. If wireless network 240 and satellite network 250 are not available, UAV platform 230 may determine that the flight path requires other networks 260 (e.g., a Wi-Fi network, a cellular network generated by a dedicated UAV 220, a mobile hotspot, etc.). If none of networks 240-260 are available, UAV platform 230 may determine that the flight path requires a most secure third party network (e.g., a third party wireless network, satellite network, etc.). In some implementations, if multiple wireless networks 240, satellite networks 250, and/or other networks 260 are available, UAV platform 230 may determine that the flight path requires a most secure of wireless networks 240, satellite networks 250, and/or other networks 260.

In some implementations, UAV platform 230 may determine that the flight path requires utilization of a network or networks with a greatest bandwidth. For example, UAV platform 230 may determine that the flight path requires wireless network 240 (e.g., a cellular network), if wireless network 240 is available, since wireless network 240 may have a greater bandwidth than satellite network 250 and/or other networks 260. If wireless network 240 is not available, UAV platform 230 may determine that the flight path requires satellite network 250 (e.g., a GPS network), if satellite network 250 is available, since satellite network 250 may have a greater bandwidth than other networks 260. If wireless network 240 and satellite network 250 are not available, UAV platform 230 may determine that the flight path requires other networks 260 (e.g., a Wi-Fi network, a cellular network generated by a dedicated UAV 220, a mobile hotspot, etc.). If none of networks 240-260 are available, UAV platform 230 may determine that the flight path requires a third party network (e.g., a third party wireless network, satellite network, etc.) with a greatest bandwidth. In some implementations, if multiple wireless networks 240, satellite networks 250, and/or other networks 260 are available, UAV platform 230 may determine that the flight path requires one of wireless networks 240, satellite networks 250, and/or other networks 260 with a greatest bandwidth.

In some implementations, UAV platform 230 may determine the network requirements based on components (e.g., sensors, network generating components, etc. of UAV 220) associated with UAV 220. For example, UAV platform 230 may determine that UAV 220 is capable of communicating with wireless network 240 but not with satellite network 250 and/or other networks 260 (e.g., since UAV 220 only includes a component to communicate with wireless network 240). In such an example, UAV platform 230 may determine that satellite network 250 and/or other networks 260 do not satisfy the network requirements, but that wireless network 240 satisfies the network requirements. In another example, UAV platform 230 may determine that UAV 220 includes a GPS component that can communicate with satellite network 250. In such an example, UAV platform 230 may determine that wireless network 240 and/or other networks 260 do not satisfy the network requirements, but that satellite network 250 satisfies the network requirements.

In some implementations, UAV platform 230 may determine the network requirements based on the aviation information associated with the particular region, such as the weather information, the air traffic information, the obstacle information, the regulatory information, the historical information, etc. associated with the particular region. For example, assume that the obstacle information indicates that the flight path requires UAV 220 to travel at an altitude of one kilometer. In such an example, UAV platform 230 may determine that the flight path requires a network (e.g., satellite network 250) that is capable of providing coverage at the one kilometer altitude. In another example, assume that the weather information indicates that the flight path requires UAV 220 to travel at an altitude of one-hundred meters to avoid strong headwinds. In such an example, UAV platform 230 may determine that the flight path requires a network (e.g., a Wi-Fi network) that is capable of providing coverage at the one-hundred meter altitude.

As further shown in FIG. 4A, process 400 may include selecting a particular network, from available networks, based on the network requirements (block 420). For example, UAV platform 230 may select a particular network, from networks 240-260 and/or third party networks, based on the determined network requirements. In some implementations, UAV platform 230 may select the particular network, from networks 240-260 and/or the third party networks, based on scores associated with networks 240-260 and/or the third party networks. In some implementations, UAV platform 230 may assign different weights to different information associated with networks 240-260 and/or the third party networks. In some implementations, UAV platform 230 may calculate a score for each of networks 240-260 and/or the third party networks based on the information associated with networks 240-260 and/or the third party networks, and/or based on the assigned weights. For example, assume that UAV platform 230 calculates a score of 0.4 for a third party network, a score of 0.7 for wireless network 240, and a score of 0.5 for satellite network 250. In such an example, UAV platform 230 may select the third party network as the particular network (e.g., via which to communicate with UAV 220) since the third party network has the lowest score.

In some implementations, UAV platform 230 may select one or more networks to utilize for the flight path, and may identify a greatest or lowest score for the selected network(s) utilized during the flight path (e.g., an end-to-end flight path score). Each of the selected network(s) may include certain coverage area(s) which may cover part of the flight path or the entire flight path. In some implementations, UAV platform 230 may select a network or a combination of networks to cover as much of the flight path as possible, with a greatest (or lowest) score(s) for the selected network(s). In some implementations, the score(s) of the selected network(s) may be relative to different parts of the flight path. For example, wireless network 240 might be the best network for one part of the flight path, but may be the worst network for another part of the flight path (e.g., even though wireless network 240 has coverage in both parts of the flight path). However, a third party network may be the best network for the other part of the flight path. In some implementations, UAV platform 230 may select an initial network to utilize for the flight path, and may select one or more additional networks, to utilize for communications with UAV 220, as UAV 220 traverses the flight path.

In some implementations, if UAV platform 230 selects a third party network for a portion of the flight path or the entire flight path, UAV platform 230 may determine whether to maintain control of UAV 220 while UAV 220 is connected to the third party network, or whether to relinquish (or hand over) control to a third party UAV platform 230 associated with the third party network. In some implementations, UAV platform 230 may maintain control of UAV 220 when UAV 220 is leaving a coverage area associated with one of networks 240-260 and entering a coverage area of the third party network. In such implementations, UAV platform 230 may instruct UAV 220 to connect to the third party network, continue to traverse the flight path without network connectivity, hover until a coverage area associated with one of networks 240-260 is found, turn around so as to not leave the coverage area associated with one of networks 240-260, etc. If UAV 220 connects with the third party network, UAV platform 230 may maintain control of UAV 220, and may communicate with UAV 220 via the third party UAV platform 230 and/or the third party network.

In some implementations, UAV platform 230 may relinquish control of UAV 220, to the third party UAV platform 230, when UAV 220 is leaving the coverage area associated with one of networks 240-260 and entering the coverage area of the third party network. In such implementations, UAV platform 230 may instruct UAV 220 to connect to the third party network, and may communicate with the third party UAV platform 230. However, the third party UAV platform 230 may communicate with and/or control UAV 220 via the third party network. The third party UAV platform 230 may provide, to UAV platform 230, information associated with the flight path of UAV 220 when UAV 220 is connected to the third party network.

In some implementations, a third party UAV 220 associated with the third party UAV platform 230 may leave the coverage area associated with the third party network, and may enter the coverage area associated with one of networks 240-260. In such implementations, UAV platform 230 may determine whether the third party UAV 220 is authorized to utilize one of networks 240-260 (e.g., based on credentials associated with the third party UAV 220 and/or the third party UAV platform 230). If the third party UAV 220 is authorized to utilize one of networks 240-260, the third party UAV platform 230 may instruct the third party UAV 220 to connect to one of networks 240-260, and may communicate with UAV platform 230. However, UAV platform 230 may communicate with and/or control the third party UAV 220 via one of networks 240-260. UAV platform 230 may provide, to the third party UAV platform 230, information associated with the flight path of the third party UAV 220 when the third party UAV 220 is connected to one of networks 240-260.

As further shown in FIG. 4A, process 400 may include generating flight path instructions that identify the selected network (block 425). For example, UAV platform 230 may generate flight path instructions that identify the selected network (e.g., wireless network 240, a third party network, etc.). In some implementations, the flight path instructions may include specific altitudes for UAV 220 between fixed geographic coordinates (e.g., a first location and a second location); navigational information (e.g., travel east for three kilometers, then north for two kilometers, etc.); expected weather conditions (e.g., headwinds, tailwinds, temperatures, etc.); network information (e.g., locations of base stations of wireless network 240 via which UAV 220 may communicate with UAV platform 230); timing information (e.g., when to take off, when to perform certain navigational maneuvers, etc.); waypoint information (e.g., locations where UAV 220 may stop and recharge or refuel); etc. For example, the flight path instructions may include information that instructs UAV 220 to fly forty-five degrees northeast for ten kilometers and at an altitude of five-hundred meters, then fly three-hundred and fifteen degrees northwest for ten kilometers and at an altitude of four-hundred meters, etc.

In some implementations, the flight path instructions may include information instructing UAV 220 to connect to network X until UAV 220 reaches point A of the flight path, then connect to network Y until UAV 220 reaches point B of the flight path, and then connect back to network X for the remainder of the flight path. In some implementations, the flight path instructions may include information instructing UAV 220 to connect to network X until UAV 220 loses connectivity, and then connect to network Y for the remainder of the flight path. In some implementations, the flight path instructions may include information instructing UAV 220 to connect to network X until UAV 220 reaches point A of the flight path, and then keep trying to connect to network Y until successful.

As further shown in FIG. 4A, process 400 may include providing the flight path instructions to the UAV (block 430). For example, UAV platform 230 may provide the flight path instructions to UAV 220. In some implementations, UAV 220 may utilize the flight path instructions to travel via the flight path. For example, UAV 220 may take off at a time specified by the flight path instructions, may travel a route and at altitudes specified by the flight path instructions, may detect and avoid any obstacles encountered in the flight path, etc. until UAV 220 arrives at the destination location.

In some implementations, if UAV 220 includes sufficient computational resources (e.g., a sufficient degree of autonomy), UAV 220 may utilize information provided by the flight path instructions to calculate a flight path for UAV 220 and to generate flight path instructions. In such implementations, the flight path instructions provided by UAV platform 230 may include less detailed information, and UAV 220 may determine more detailed flight path instructions via the computational resources of UAV 220.

As further shown in FIG. 4A, process 400 may include receiving network connectivity information from the UAV during traversal of the flight path by the UAV (block 435). For example, while UAV 220 is traveling along the flight path in accordance with the flight path instructions, UAV 220 and/or the selected network (e.g., one or more of networks 240-260) may provide network connectivity information to UAV platform 230, and UAV platform 230 may receive the network connectivity information. In some implementations, the network connectivity information may include information associated with a connection between UAV 220 and the selected network. For example, the network connectivity information may include information associated with signal strength between UAV 220 and the selected network, a bandwidth provided by the selected network to UAV 220, etc.

As shown in FIG. 4B, process 400 may include identifying a third party network and/or a third party UAV platform based on the network connectivity information (block 440). For example, UAV platform 230 may identify a third party network (e.g., a third party wireless network, satellite network, etc.) and a third party UAV platform 230 based on the network connectivity information. In some implementations, if the network connectivity information indicates that UAV 220 is leaving a coverage area associated with the selected network (e.g., one of networks 240-260) and entering a coverage area associated with the third party network, UAV platform 230 may identify the third party network and a third party UAV platform 230 associated with the third party network. In some implementations, the network connectivity information may include information identifying the third party network (e.g., a system identification code (SID) of the third party network); information associated with a signal strength received by UAV 220 from the third party network; a bandwidth provided by the third party network; security information associated with the third party network; information identifying the third party UAV platform 230; etc. In some implementations, UAV platform 230 may not identify the third party network and/or the third party UAV platform 230, if the network connectivity information indicates that UAV 220 will continue to communicate with UAV platform 230 via the coverage area associated with the selected network.

As further shown in FIG. 4B, process 400 may include connecting with the third party network (block 445). For example, if the network connectivity information indicates that UAV 220 is leaving the coverage area associated with the selected network and entering the coverage area associated with the third party network, UAV platform 230 may connect with the third party network. In some implementations, UAV platform 230 may connect with the third party network if the network connectivity information indicates that UAV 220 is losing or will lose a signal received from the selected network (e.g., UAV 220 will not be able to communicate with UAV platform 230). In such implementations, UAV platform 230 may connect with the third party network so that UAV 220 may continue to communicate with UAV platform 230 via the third party network. For example, assume that UAV 220 is communicating with UAV platform 230 via wireless network 240, but is about to fly out of a coverage area of wireless network 240. Further, assume that UAV 220 is flying into a coverage area of a third party network. In such an example, UAV platform 230 may instruct UAV 220 to disconnect from wireless network 240 and to connect with the third party network so that UAV 220 may communicate with UAV platform 230 via the third party network.

As further shown in FIG. 4B, process 400 may include determining whether to hand over control of the UAV to the third party UAV platform (block 450). For example, UAV platform 230 may determine whether to hand over control of UAV 220 to the third party UAV platform 230. In some implementations, UAV platform 230 may determine to not hand over control and may maintain control of UAV 220 when UAV 220 is leaving a coverage area associated with one of networks 240-260 and entering a coverage area of the third party network. In such implementations, UAV platform 230 may instruct UAV 220 to connect to the third party network, continue to traverse the flight path without network connectivity, hover until a coverage area associated with one of networks 240-260 is found, turn around so as to not leave the coverage area associated with one of networks 240-260, etc. If UAV 220 connects with the third party network, UAV platform 230 may maintain control of UAV 220, and may communicate with UAV 220 via the third party UAV platform 230 and the third party network (e.g., if UAV platform 230 is authorized and capable to utilize the third party network).

In some implementations, UAV platform 230 may determine to hand over control of UAV 220, to the third party UAV platform 230, when UAV 220 is leaving the coverage area associated with one of networks 240-260 and entering the coverage area of the third party network. In such implementations, UAV platform 230 may instruct UAV 220 to connect to the third party network, and may communicate with the third party UAV platform 230. However, the third party UAV platform 230 may communicate with and/or control UAV 220 via the third party network. The third party UAV platform 230 may provide, to UAV platform 230, information associated with the flight path of UAV 220 when UAV 220 is connected to the third party network.

As further shown in FIG. 4B, if control of the UAV is handed over to the third party UAV platform (block 450—YES), process 400 may include connecting with the third party UAV platform (block 455). For example, if UAV platform 230 determines to relinquish control of UAV 220 to the third party UAV platform 230, UAV platform 230 may connect with the third party UAV platform 230. In some implementations, UAV platform 230 may communicate with the third party UAV platform 230 via the connection with the UAV platform 230. In such implementations, the third party UAV platform 230 may communicate with and/or control UAV 220 via the third party network, and may provide information associated UAV 220 to UAV platform 230 (e.g., so that UAV platform 230 may monitor UAV 220).

As further shown in FIG. 4B, process 400 may include providing the flight path instructions to the third party UAV platform (block 460). For example, UAV platform 230 may provide the flight path instructions to the third party UAV platform 230. In some implementations, UAV platform 230 may generate modified flight path instructions, which include information associated with the third party network, based on the network connectivity information. UAV platform 230 may provide the modified flight path instructions to the third party UAV platform 230. In some implementations, the modified flight path instructions may include the features of flight path instructions, but may be modified based on the network connectivity information. For example, the flight path instructions may be modified to instruct UAV 220 to disconnect from the selected network and connect with the third party network.

As further shown in FIG. 4B, process 400 may include receiving the flight path information from the third party UAV platform (block 465). For example, UAV 220 may continue to traverse the flight path while connected to the third party network, and may generate flight path information while traversing the flight path. The flight path information may include information associated with connectivity between UAV 220 and the third party network; component information (e.g., battery life, sensor functionality, etc.) associated with UAV 220; flight information (e.g., a speed of UAV 220, an altitude of UAV 220, etc.); sensor information (e.g., weather information, video information, audio information, etc. captured by UAV 220); etc. In some implementations, UAV 220 may provide the flight path information to the third party UAV platform 230 (e.g., when UAV platform 230 relinquishes control of UAV 220), via the third party network, and the third party UAV platform 230 may provide the flight path information to UAV platform 230. In some implementations, UAV 220 may provide the flight path information to UAV platform 230, via the third party network, when UAV platform 230 maintains control of UAV 220. UAV platform 230 may receive the flight path information from the third party UAV platform 230 or directly from the third party network.

As further shown in FIG. 4B, if control of the UAV is not handed over to the third party UAV platform (block 450—NO) or after receiving the flight path information from the third party UAV platform (block 465), process 400 may include receiving a notification that the UAV arrived at the second location (block 470). For example, UAV platform 230 may determine to not hand over control of UAV 220 to the third party UAV platform 230 when UAV 220 is leaving the coverage area associated with the selected network and entering the coverage area of the third party network. In some implementations, UAV platform 230 may maintain control of UAV 220, and may communicate with UAV 220 via the third party UAV platform 230 and the third party network. In some implementations, UAV 220 may continue along the flight path based on the flight path instructions until UAV 220 arrives at the destination location, whether UAV platform 230 maintains control of UAV 220 or relinquishes control of UAV 220. When UAV 220 arrives at the destination location, UAV 220 may provide a notification to UAV platform 230. In some implementations, the notification may indicate that UAV 220 has safely arrived at the destination location.

Although FIGS. 4A and 4B shows example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5A:
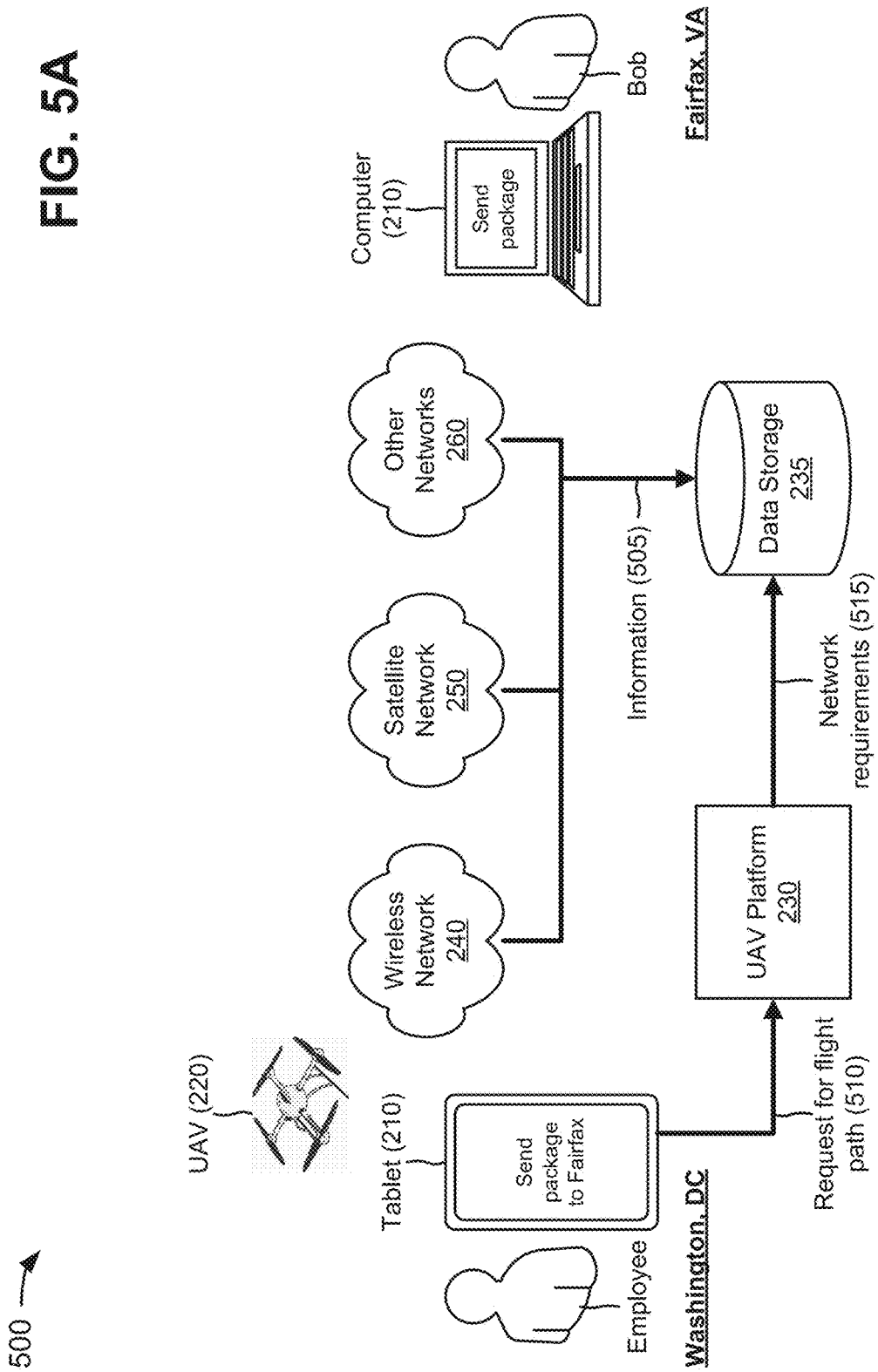

FIGS. 5A-5E are diagrams of an example 500 relating to example process 400 shown in FIGS. 4A and 4B. Assume that a first user device 210 (e.g., a tablet 210) is associated with a first user (e.g., an employee at a delivery company) that is located at an origination location (e.g., Washington, D.C.), as shown in FIG. 5A. Further, assume that a second user device 210 (e.g., a computer 210) is associated with a second user (e.g., Bob) that is located at a destination location (e.g., Fairfax, Va.), and that Bob has instructed computer 210 to request delivery of a package to Fairfax, Va. For example, computer 210 may inform tablet 210 (e.g., via one or more servers associated with the delivery company) and the employee that the package is to be delivered to Bob as soon as possible. Further, assume that the employee wants to utilize UAV 220 to fly the package from Washington, D.C. to Fairfax, Va. in order to deliver the package to Bob.

As further shown in FIG. 5A, UAV platform 230 and data storage 235 may communicate with wireless network 240, satellite network 250, and/or other networks 260. One or more of networks 240-260 may provide, to data storage 235, information 505, such as capability information associated with UAV 220, weather information associated with a geographical region (e.g., that includes a geographical location of Washington, D.C., a geographical location of Fairfax, Va., and geographical locations between Washington and Fairfax), air traffic information associated with the geographical region, obstacle information associated with the geographical region, regulatory information associated with the geographical region, historical information associated with the geographical region, etc.

As further shown in FIG. 5A, the employee may instruct tablet 210 to generate a request 510 for a flight path (e.g., from Washington, D.C. to Fairfax, Va.) for UAV 220, and to provide request 510 to UAV platform 230. Request 510 may include credentials (e.g., a serial number, an identifier of a UICC, etc.) associated with UAV 220, or the credentials may be provided separately from request 510 to UAV platform 230. UAV platform 230 may utilize the credentials to determine whether UAV 220 is authenticated for utilizing UAV platform 230 and/or one or more of networks 240-260, and is registered with an appropriate authority for use. For example, UAV platform 230 may compare the credentials with information provided in data storage 235 in order to determine whether UAV 220 is authenticated for utilizing UAV platform 230 and/or one or more of networks 240-260, and is registered with an appropriate authority. Assume that UAV 220 is authenticated and/or registered.

UAV platform 230 may calculate a flight path from Washington, D.C. to Fairfax, Va. based on information 505 (e.g., weather information, air traffic information, obstacle information, regulatory information, historical information, etc.) provided in data storage 235. For example, assume that the weather information indicates that the wind is ten kilometers per hour from the west and that it is raining; the air traffic information indicates that a jet is at an altitude of ten-thousand meters and another UAV 220 is at an altitude of five-hundred meters; the obstacle information indicates that a mountain is two kilometers in height and a building is five-hundred meters in height; the regulatory information indicates that there is a no-fly zone over a government building; and the historical information indicates that a historical flight path had a duration of thirty minutes and an altitude of one-thousand meters. UAV platform 230 may calculate the flight path from Washington, D.C. to Fairfax, Va. based on such information.

As further shown in FIG. 5A, UAV platform 230 may determine network requirements 515 for the requested flight path based on request 510. For example, UAV platform 230 may determine that network requirements 515 include UAV 220 utilizing one or more of networks 240-260 and/or one or more third party networks to communicate with UAV platform 230 during the flight path. UAV platform 230 may provide network requirements 515 to data storage 235 (e.g., for storage).

As shown in FIG. 5B, UAV platform 230 may retrieve, from data storage 235, information 520 associated with available networks, such as, for example bandwidth information, security information, coverage area information, etc. UAV platform 230 may select a particular network (e.g., wireless network 240), from the available networks, based on network requirements 515, as indicated by reference number 525. As further shown in FIG. 5B, UAV 220 may connect 530 with wireless network 240 based on the selection of wireless network 240 as the particular network. Once connected to wireless network 240, UAV 220 may communicate with UAV platform 230 via wireless network 240.

The calculated flight path from Washington, D.C. to Fairfax, Va. is depicted by reference number 535 in FIG. 5C. As further shown in FIG. 5C, UAV platform 230 may generate flight path instructions 540 for flight path 535. Flight path instructions 540 may include, for example, information instructing UAV 220 to fly north at zero degrees for ten kilometers, then northeast at forty degrees for three kilometers, at an altitude of one-thousand meters, etc. UAV platform 230 may provide flight path instructions 540 to UAV 220 via wireless network 240. The package may be attached to or provided in UAV 220 (e.g., by the employee). UAV 220 may take off from Washington, D.C. with the package, and may travel flight path 535 based on flight path instructions 540.

While UAV 220 is traveling along flight path 535, UAV 220 and/or wireless network 240 may provide network connectivity information 545 to UAV platform 230, as shown in FIG. 5D. Assume that UAV 220 is flying out of range of a coverage area associated with wireless network 240 and is flying into range of a coverage area associated with a third party wireless network 240 associated with a third party UAV platform 230. UAV 220 may provide, to UAV platform 230, information indicating that UAV 220 is losing connectivity with wireless network 240 and flying into range of the third party wireless network 240 (e.g., via network connectivity information 545). Based on network connectivity information 545, UAV platform 230 may identify the third party wireless network 240 as a network that enables UAV 220 to communicate with UAV platform 230, as indicated by reference number 550. Assume that UAV platform 230 instructs wireless network 240 to hand over 555 communications with UAV 220 to the third party wireless network 240. As further shown in FIG. 5D, UAV 220 may connect 560 with the third party wireless network 240, and may communicate with the third party UAV platform 230 via the third party wireless network 240. While communications are being switched from wireless network 240 to the third party wireless network 240, UAV platform 230 may hand over control of UAV 220 to the third party UAV platform 230, and may provide flight path instructions 540 to the third party UAV platform 230. UAV 220 may communicate with the third party UAV platform 230, via the third party wireless network 240, and may continue to travel along flight path 535 until UAV 220 arrives at Fairfax, Va.

As shown in FIG. 5E, while UAV 220 continues to traverse flight path 535, UAV 220 may provide flight path information 565 to the third party wireless network 240. Flight path information 565 may include information associated with components of UAV 220, an altitude of UAV 220, measurement information received by UAV 220, a speed of UAV 220, a location of UAV 220, etc. The third party wireless network 240 may provide flight path information 565 to the third party UAV platform 230, and the third party UAV platform 230 may provide flight path information 565 to UAV platform 230. As further shown in FIG. 5E, when UAV 220 arrives at Fairfax, Va., UAV 220 may leave the package at a location where Bob may retrieve the package. UAV 220 and/or computer 210 (e.g., via Bob's input or detection of the presence of UAV 220) may generate a notification 570 indicating that UAV 220 and the package arrived safely at a particular location in Fairfax, Va., and may provide notification 570 to the third party UAV platform 230. The third party UAV platform 230 may provide notification 570 to UAV platform 230.

As indicated above, FIGS. 5A-5E are provided merely as an example. Other examples are possible and may differ from what was described with regard to FIGS. 5A-5E.

FIGS. 6A-6D are diagrams of another example 600 relating to example process 400 shown in FIGS. 4A and 4B. Assume that the employee wants to utilize a third party UAV 220 to fly the package from Washington, D.C. to Fairfax, Va. in order to deliver the package to Bob. Further, assume that the third party UAV 220 is associated with the third party UAV platform 230 and the third party wireless network 240, but is not associated with UAV platform 230 and wireless network 240. As shown in FIG. 6A, the employee may instruct tablet 210 to generate a request 605 for a flight path (e.g., from Washington, D.C. to Fairfax, Va.) for the third party UAV 220, and to provide request 605 to the third party UAV platform 230. The third party UAV 220 may connect 610 with third party wireless network 240, and may communicate with the third party UAV platform 230 via the third party wireless network 240.

As further shown in FIG. 6A, the third party UAV platform 230 may calculate a flight path 615 from Washington, D.C. to Fairfax, Va. based on information, such as, for example, weather information, air traffic information, obstacle information, regulatory information, historical information, etc. The third party UAV platform 230 may generate flight path instructions 620 for flight path 615. Flight path instructions 620 may include, for example, information instructing the third party UAV 220 to fly north at zero degrees for ten kilometers, then northeast at forty degrees for three kilometers, at an altitude of one-thousand meters, etc. The third party UAV platform 230 may provide flight path instructions 620 to the third party UAV 220 via the third party wireless network 240. The package may be attached to or provided in the third party UAV 220 (e.g., by the employee). The third party UAV 220 may take off from Washington, D.C. with the package, and may travel flight path 615 based on flight path instructions 620.

While the third party UAV 220 is traveling along flight path 615, the third party UAV 220 and/or the third party wireless network 240 may provide network connectivity information 625 to the third party UAV platform 230, as shown in FIG. 6B. Assume that the third party UAV 220 is flying out of range of a coverage area associated with the third party wireless network 240 and is flying into range of a coverage area associated with wireless network 240. The third party UAV 220 may provide, to the third party UAV platform 230, information indicating that the third party UAV 220 is losing connectivity with the third party wireless network 240 and flying into range of wireless network 240 (e.g., via network connectivity information 625). Based on network connectivity information 625, the third party UAV platform 230 may identify wireless network 240 as a network that enables the third party UAV 220 to communicate with the third party UAV platform 230. The third party UAV platform 230 may decide to hand over control of the third party UAV 220 to UAV platform 230, and may provide a request 630 to hand over control of the third party UAV 220 to UAV platform 230. Assume that UAV platform 230 determines that the third party UAV 220 is authorized to utilize UAV platform 230 and/or wireless network 240, and provides a message 635, indicating that request 630 is approved, to the third party UAV platform 230.

Based on message 635, the third party UAV platform 230 may instruct the third party wireless network 240 to hand over 640 communications with the third party UAV 220 to wireless network 240, as shown in FIG. 6C. As further shown in FIG. 6C, the third party UAV 220 may connect 645 with wireless network 240, and may communicate with UAV platform 230 via wireless network 240. While communications are being switched from the third party wireless network 240 to wireless network 240, the third party UAV platform 230 may hand over control of the third party UAV 220 to UAV platform 230, and may provide flight path instructions 620 to UAV platform 230. The third party UAV 220 may communicate with UAV platform 230, via wireless network 240, and may continue to travel along flight path 615 until the third party UAV 220 arrives at Fairfax, Va.

As shown in FIG. 6D, while the third party UAV 220 continues to traverse flight path 615, the third party UAV 220 may provide flight path information 650 to wireless network 240. Flight path information 650 may include information associated with components of the third party UAV 220, an altitude of the third party UAV 220, measurement information received by the third party UAV 220, a speed of the third party UAV 220, a location of the third party UAV 220, etc. Wireless network 240 may provide flight path information 650 to UAV platform 230, and UAV platform 230 may provide flight path information 650 to the third party UAV platform 230. As further shown in FIG. 6D, when the third party UAV 220 arrives at Fairfax, Va., the third party UAV 220 may leave the package at a location where Bob may retrieve the package. The third party UAV 220 and/or computer 210 (e.g., via Bob's input or detection of the presence of the third party UAV 220) may generate a notification 655 indicating that the third party UAV 220 and the package arrived safely at a particular location in Fairfax, Va., and may provide notification 655 to UAV platform 230. UAV platform 230 may provide notification 655 to the third party UAV platform 230.

As indicated above, FIGS. 6A-6D are provided merely as an example. Other examples are possible and may differ from what was described with regard to FIGS. 6A-6D.

Systems and/or methods described herein may provide a platform that enables UAVs to safely traverse flight paths from origination locations to destination locations. The systems and/or methods may enable UAVs to seamlessly connect with various third party networks and/or a third party platform, which may ensure that the platform and/or the third party platform continuously communicate with the UAVs. The systems and/or methods may enable the platform to select a third party network for communicating with the UAV, and the selected third party network may ensure that the UAV traverses a flight path with network connectivity.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a platform device, a request for a flight path, for an unmanned aerial vehicle to travel, from a first geographical location to a second geographical location;
    calculating, by the platform device, the flight path from the first geographical location to the second geographical location based on the request for the flight path;
    determining, by the platform device, network requirements that enable the platform device to communicate with the unmanned aerial vehicle, during traversal of the flight path by the unmanned aerial vehicle, based on the request for the flight path;
    selecting, by the platform device, a network based on the network requirements;
    causing, by the platform device, a connection with the unmanned aerial vehicle and the network to be established;
    generating, by the platform device and based on causing the connection with the unmanned aerial vehicle and the network to be established, flight path instructions instructing the unmanned aerial vehicle to traverse the flight path,
    the flight path instructions identifying the network;
    providing, by the platform device and via the network, the flight path instructions to the unmanned aerial vehicle to permit the unmanned aerial vehicle to travel from the first geographical location to the second geographical location via the flight path;
    receiving, by the platform device and at a particular point of the flight path, an indication that the unmanned aerial vehicle is leaving a first coverage area associated with the network and entering a second coverage area associated with another network; and
    handing off, by the platform device and based on receiving the indication, control of the unmanned aerial vehicle to another device, associated with the other network, to permit the other device to control the unmanned aerial vehicle via the other network.

2. The method of claim 1, further comprising:
    receiving, from the unmanned aerial vehicle, information associated with the flight path, via the other network and the other device, after handing off control of the unmanned aerial vehicle to the other device.

3. The method of claim 1,
further comprising
providing the flight path instructions to the other device.

4. The method of claim 1, further comprising:
receiving information associated with the flight path from the other device while the unmanned aerial vehicle is being controlled by the other device.

5. The method of claim 1, where:
the network and the platform device are associated with a first entity, and
the other network and the other device are associated with a second entity,
the second entity being different than the first entity.

6. The method of claim 1, further comprising:
causing the connection to be terminated after control of the unmanned aerial vehicle is handed off to the other device.

7. The method of claim 1, further comprising:
instructing the unmanned aerial vehicle to hover until control of the unmanned aerial vehicle is handed off to the other device.

8. A system, comprising:
one or more platform devices to:
receive a request for a flight path, for an unmanned aerial vehicle to travel, from a first geographical location to a second geographical location;
calculate the flight path from the first geographical location to the second geographical location based on the request for the flight path;
determine network requirements that enable a platform device, of the one or more platform devices, to communicate with the unmanned aerial vehicle, during traversal of the flight path by the unmanned aerial vehicle, based on the request for the flight path;
select a network based on the network requirements;
cause a connection with the unmanned aerial vehicle and the network to be established;
generate based on causing the connection with the unmanned aerial vehicle and the network to be established, flight path instructions instructing the unmanned aerial vehicle to traverse the flight path;
provide, via the network, the flight path instructions to the unmanned aerial vehicle to permit the unmanned aerial vehicle to travel from the first geographical location to the second geographical location via the flight path;
receive, at a particular point of the flight path, an indication that the unmanned aerial vehicle is leaving a first coverage area associated with the network and entering a second coverage area associated with another network; and
hand off, based on receiving the indication, control of the unmanned aerial vehicle to another system, associated with the other network, to permit the other system to control the unmanned aerial vehicle via the other network.

9. The system of claim 8, where the one or more platform devices are further to:
receive, from the unmanned aerial vehicle, information associated with the flight path, via the other network and the other system, after handing off control of the unmanned aerial vehicle to the other system.

10. The system of claim 8, where the one or more platform devices are further to:
authenticate the other system; and
where, when handing off control of the unmanned aerial vehicle, the one or more platform devices are to:
hand off control of the unmanned aerial vehicle to the other system, associated with the other network, based on authenticating the other system.

11. The system of claim 8, where the one or more platform devices are further to:
provide the flight path instructions to the other system after control of the unmanned aerial vehicle is handed off to the other system; and
receive information associated with the flight path from the other system, after control of the unmanned aerial vehicle is handed off to the other system.

12. The system of claim 8, where:
the network and the system are associated with a first entity, and
the other network and the other system are associated with a second entity,
the second entity being different than the first entity.

13. The system of claim 8, where the one or more platform devices are further to:
cause the connection to be terminated after control of the unmanned aerial vehicle is handed off to the other system.

14. The system of claim 8, where the one or more platform devices are further to:
receive, from the other system, arrival information associated with the unmanned aerial vehicle when the unmanned aerial vehicle arrives at the second geographical location.

15. A non-transitory computer-readable medium for storing instructions, the instructions comprising:
one or more instructions that, when executed by one or more processors of a platform device, cause the one or more processors to:
receive a request for a flight path, for an unmanned aerial vehicle to travel, from a first geographical location to a second geographical location;
calculate the flight path from the first geographical location to the second geographical location based on the request for the flight path;
determine network requirements that enable the platform device to communicate with the unmanned aerial vehicle, during traversal of the flight path by the unmanned aerial vehicle, based on the request for the flight path;
select a network based on the network requirements;
cause a connection with the unmanned aerial vehicle and the network to be established;
generate, based on causing the connection with the unmanned aerial vehicle and the network to be established, flight path instructions instructing the unmanned aerial vehicle to traverse the flight path; the flight path instructions identifying the network;
provide, via the network, the flight path instructions to the unmanned aerial vehicle to permit the unmanned aerial vehicle to travel from the first geographical location to the second geographical location via the flight path;
receive, at a particular point of the flight path, an indication that the unmanned aerial vehicle is leaving a first coverage area associated with the network and entering a second coverage area associated with another network; and
hand off, based on receiving the indication, control of the unmanned aerial vehicle to another device, associated with the other network, to permit the other device to control the unmanned aerial vehicle via the other network.

16. The non-transitory computer-readable medium of claim 15, where the one or more instructions, when executed by the one or more processors, further cause the one or more processors to:
receive, from the unmanned aerial vehicle, information associated with the flight path, via the other network and the other device, after handing off control of the unmanned aerial vehicle to the other device.

17. The non-transitory computer-readable medium of claim 15, where the one or more instructions,
when executed by the one or more processors, further cause the one or more processors to:
provide the flight path instructions to the other device; and
receive information associated with the flight path from the other device while the unmanned aerial vehicle is being controlled by the other device.

18. The non-transitory computer-readable medium of claim 15, where the one or more instructions, when executed by the one or more processors, further cause the one or more processors to:
receive, from the other device, arrival information associated with the unmanned aerial vehicle when the unmanned aerial vehicle arrives at the second geographical location.

19. The non-transitory computer-readable medium of claim 15, where the one or more instructions, when executed by the one or more processors, further cause the one or more processors to:
cause the connection to be terminated after control of the unmanned aerial vehicle is handed off to the other device.

20. The non-transitory computer-readable medium of claim 15, where the one or more instructions, when executed by the one or more processors, further cause the one or more processors to:
instruct the unmanned aerial vehicle to hover until control of the unmanned aerial vehicle is handed off to the other device.

* * * * *